(12) United States Patent
Delhoume et al.

(10) Patent No.: US 12,356,162 B2
(45) Date of Patent: *Jul. 8, 2025

(54) WEARABLE AUDIO DEVICE WITHIN A DISTRIBUTED AUDIO PLAYBACK SYSTEM

(71) Applicant: Sonos, Inc., Santa Barbara, CA (US)

(72) Inventors: Alexia Delhoume, Boston, MA (US); Brian Roberts, Boston, MA (US); Elizabeth Dolman, Boston, MA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/449,519

(22) Filed: Aug. 14, 2023

(65) Prior Publication Data

US 2024/0040313 A1    Feb. 1, 2024

Related U.S. Application Data

(63) Continuation of application No. 17/470,155, filed on Sep. 9, 2021, now Pat. No. 11,758,326.

(Continued)

(51) Int. Cl.
*H04R 3/12* (2006.01)
*H04B 7/26* (2006.01)
(Continued)

(52) U.S. Cl.
CPC ............. *H04R 3/12* (2013.01); *H04B 7/2662* (2013.01); *H04N 21/43615* (2013.01);
(Continued)

(58) Field of Classification Search
None
See application file for complete search history.

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| EP | 1389853 A1 | 2/2004 |
| EP | 2301263 B1 | 12/2013 |

(Continued)

OTHER PUBLICATIONS

AudioTron Quick Start Guide, Version 1.0, Mar. 2001, 24 pages.

(Continued)

*Primary Examiner* — Kenny H Truong
(74) *Attorney, Agent, or Firm* — FORTEM IP LLP

(57) ABSTRACT

A media system comprises one or more non-wearable playback devices, a gateway device, and a wearable playback device. The one or more non-wearable playback devices are configured to receive media content and to play the media content in synchrony with one another. The gateway device is commutatively coupled with at least one of the non-wearable playback devices and is configured to receive the media content. The wearable playback device comprises a microphone and a transducer and is commutatively coupled to the gateway device. The wearable playback device is configured to receive the media content and to simultaneously play ambient audio received via the microphone and the media content via the transducer while the one or more non-wearable playback devices play the media content.

20 Claims, 17 Drawing Sheets

Related U.S. Application Data

(60) Provisional application No. 63/198,049, filed on Sep. 25, 2020, provisional application No. 63/082,273, filed on Sep. 23, 2020, provisional application No. 62/706,853, filed on Sep. 14, 2020, provisional application No. 63/076,342, filed on Sep. 9, 2020.

(51) Int. Cl.
  *H04N 21/436* (2011.01)
  *H04R 25/00* (2006.01)
  *H04S 7/00* (2006.01)

(52) U.S. Cl.
  CPC ........... *H04R 25/407* (2013.01); *H04S 7/308* (2013.01); *H04R 2225/55* (2013.01)

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2011/0142268 | A1 | 6/2011 | Iwakuni et al. |
| 2013/0034234 | A1 | 2/2013 | Chen et al. |
| 2013/0114821 | A1* | 5/2013 | Hamalainen ........... H04R 5/033 381/71.6 |
| 2019/0202062 | A1 | 7/2019 | Park et al. |

FOREIGN PATENT DOCUMENTS

| | | |
|---|---|---|
| EP | 2835986 B1 | 10/2017 |
| WO | 200153994 | 7/2001 |
| WO | 2003093950 A2 | 11/2003 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion mailed on Mar. 3, 2022, issued in connection with International Application No. PCT/US2021/049662, filed on Sep. 9, 2021, 25 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Oct. 28, 2022, issued in connection with U.S. Appl. No. 17/470,155, filed Sep. 9, 2021, 8 pages.
Notice of Allowance mailed on Feb. 15, 2023, issued in connection with U.S. Appl. No. 17/470,155, filed Sep. 9, 2021, 7 pages.
Notice of Allowance mailed on Jun. 7, 2023, issued in connection with U.S. Appl. No. 17/470,155, filed Sep. 9, 2021, 8 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Communication pursuant to Article 94(3) EPC dated Nov. 6, 2024; European Patent Application No. 21791516.4; Applicant: Sonos, Inc.; 9 pages.

* cited by examiner

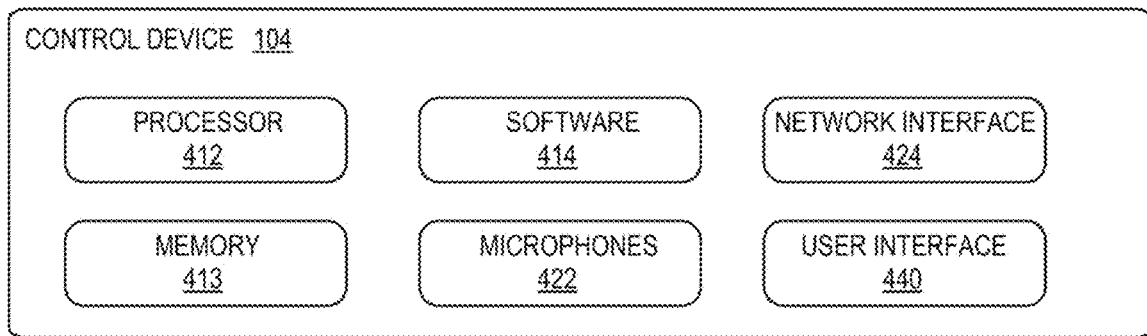
Fig. 4A
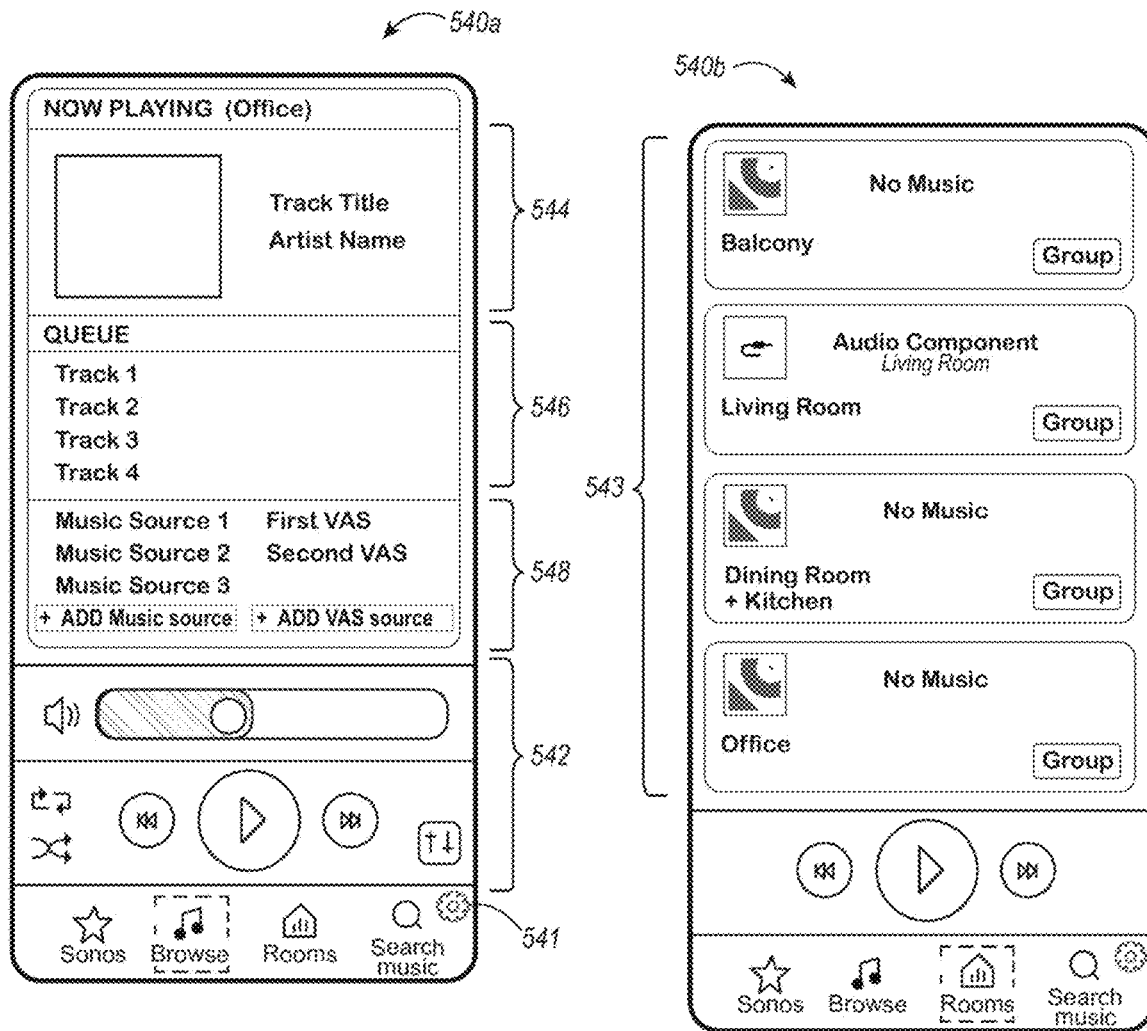
Fig. 4B
Fig. 4C

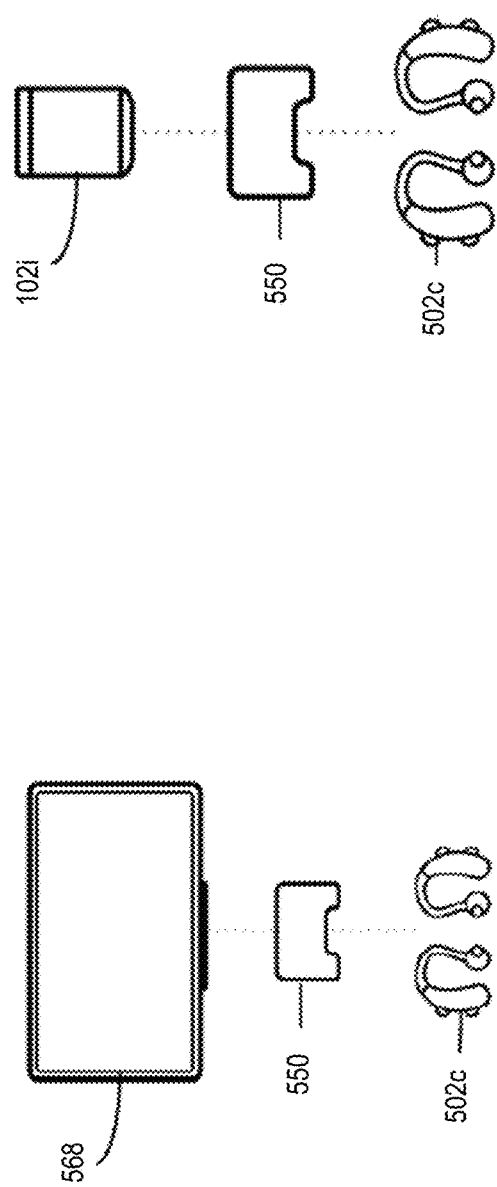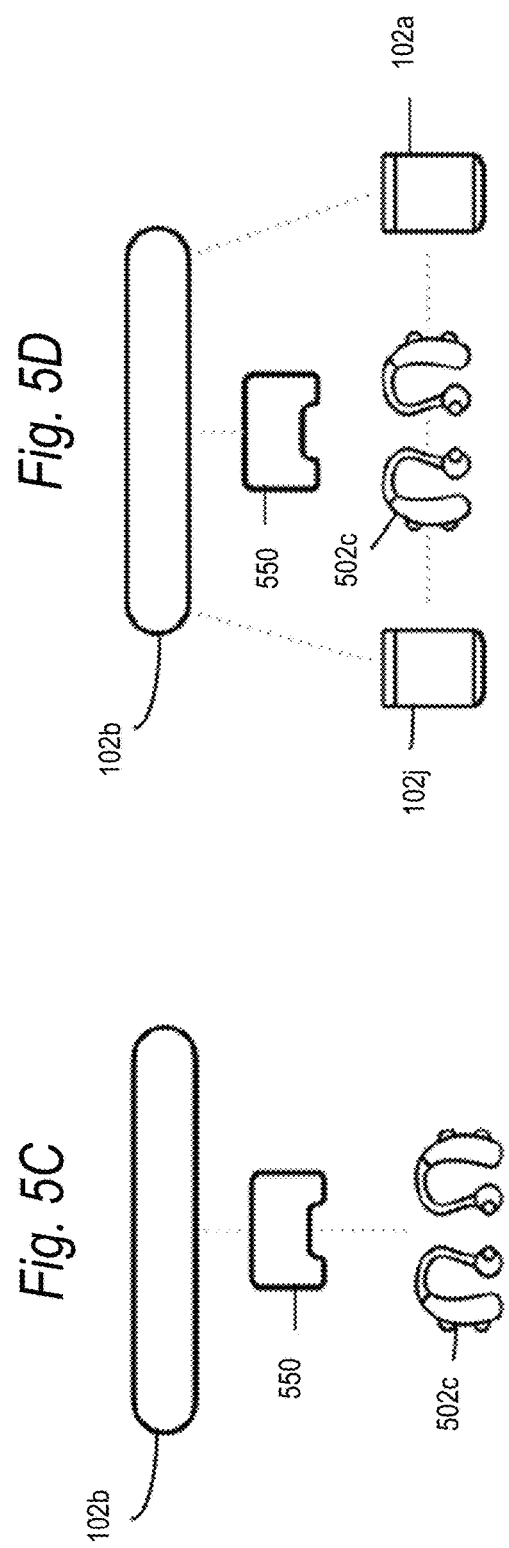

WEARABLE AUDIO DEVICE WITHIN A DISTRIBUTED AUDIO PLAYBACK SYSTEM

CROSS-REFERENCE TO RELATED APPLICATIONS

This application is a continuation of U.S. patent application Ser. No. 17/470,155, filed Sep. 9, 2021, now U.S. Pat. No. 11,758,326, which claims the benefit of priority to U.S. Patent Application No. 63/076,342, filed Sep. 9, 2020, U.S. Patent Application No. 62/706,853, filed Sep. 14, 2020, U.S. Patent Application No. 63/082,273, filed Sep. 23, 2020, and U.S. Patent Application No. 63/198,049, filed Sep. 25, 2020, each of which are incorporated herein by reference in their entirety.

TECHNICAL FIELD

The present technology relates to consumer goods and, more particularly, to methods, systems, products, features, services, and other elements directed to media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings.

FIG. 4A is a functional block diagram of an example controller device in accordance with aspects of the disclosure.

FIGS. 4B and 4C are controller interfaces in accordance with aspects of the disclosure.

FIGS. 5C, 5D, 5E, and 5F illustrate example arrangements of wearable playback devices with respect to one or more external devices.

Figure 1A:
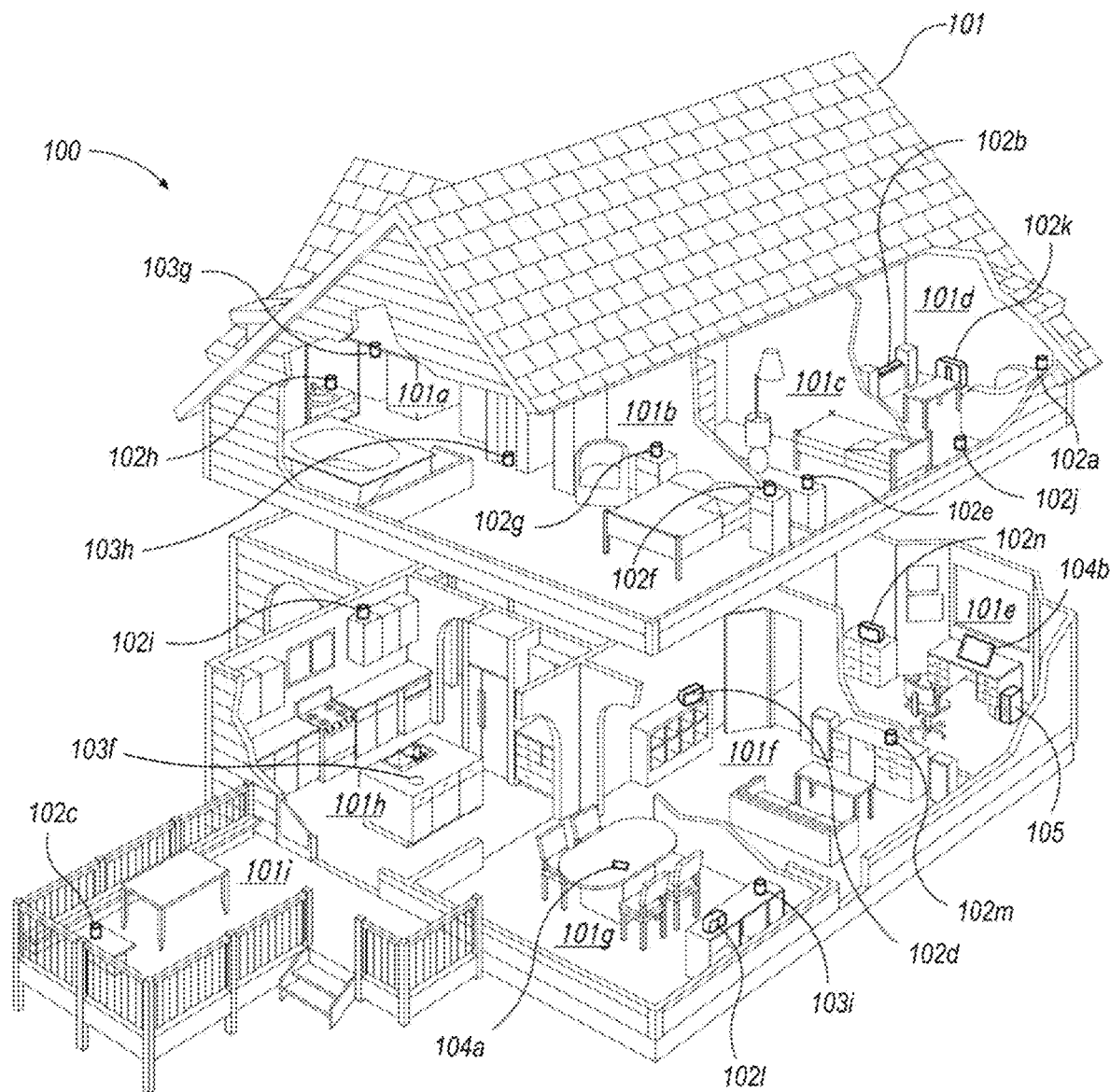
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Wearable audio playback devices, such as hearing aids or headphones, can offer private listening experiences in which the audio presented to the user is not audible to others nearby. However, in some multi-device environments, such as in at-home listening or the home theater context, it can be beneficial to coordinate playback between wearable and non-wearable playback devices. This can be particularly true of wearable playback devices, such hearing aids, that amplify ambient sound to improve audio perception for users who have hearing impairment.

Conventionally, a hearing aid includes one or more microphones and one or more audio transducers. The hearing aid detects audio input from the surrounding environment via the microphone(s) and plays back an amplified form of the audio via the audio transducer(s). In instances in which a hearing aid user wishes to listen to audio content, such as music, television or movie audio, radio, podcasts, etc., the user's experience can be improved by providing such media content directly to the hearing aid and having the hearing aid render the audio data samples for playback. For example, the hearing aid can include a wireless transceiver configured to receive audio content (e.g., an audio stream) from a source device. The hearing aid can then play back the audio content via the transducers, without relying on amplification of sounds in the environment.

In some instances, a hearing aid user may wish to listen to such audio content while a non-hearing aid user nearby wishes to listen to the same audio content. For instance, consider a family watching a movie together, in which one family member uses a hearing aid and one does not. The shared experience can be improved if the accompanying audio content is played back both via non-wearable playback devices (e.g., a soundbar or other such device) and via a wearable device (e.g., a hearing aid). By playing back the accompanying audio directly via the hearing aid (rather than relying on the hearing aid to amplify audio played back via a soundbar or other such device), the hearing aid can provide higher quality and personalized audio and improve the user experience. In these and other instances, it can be useful to coordinate between wearable and non-wearable playback devices.

Coordination between wearable and non-wearable playback devices can present certain challenges, particularly in the home theatre environment. For example, because a wearable playback device will be portable and able to move around the environment, it may be desirable to dynamically group and un-group the wearable playback device with other playback devices in the environment. Additionally, when a wearable playback device is grouped with other playback devices in a home theatre context, it may be desirable to provide independent volume control such that increasing the volume of a soundbar or other home theatre playback devices might not necessarily increase the volume of the wearable playback device. For example, while a wearable playback device is grouped and/or bonded with one or more non-wearable playback devices, a volume setting for the group or zone is configured to not control the volume of the wearable playback device.

In some embodiments, the volume setting of the wearable device can be entirely independent, for example being independently controlled via settings on the device itself (e.g., buttons, dials), via a separate remote, the gateway, or other such input device. In some embodiments, the volume setting of the wearable playback device can be only partially controlled via the volume setting of the group. As another example, the particular audio played back via the wearable and non-wearable playback devices may differ, such as delivering only speech frequencies via the wearable playback device, while delivering full-frequency audio content via the non-wearable playback devices.

In some environments, a wearable playback device can be configured to receive audio content from multiple different audio source devices, either simultaneously or alternately. Example audio source devices include external playback devices (e.g., a soundbar, a stationary playback device, a portable playback device, another wearable playback device, etc.). In some embodiments, an audio source device can be or can include a gateway device that receives audio content (or other media content) from another device and transmits the audio content to the wearable playback device. For example, such a gateway device can be coupled to a non-wearable playback device such as a soundbar (e.g., via wired or wireless communication). The gateway device may then receive audio from the non-wearable playback device and transmit the audio content (e.g., via wireless transmission) to the wearable playback device for audio playback. In some examples, a gateway device can be configured to automatically connect to a non-wearable playback device within its broadcasting range, thereby simplifying the user's ability to transmit audio from any given source device to a wearable playback device (e.g., a hearing aid).

Such gateway devices can facilitate access to multiple different audio sources for a user of a wearable playback device. For example, consider a wearable playback device user in a home environment that includes a first playback device (e.g., a soundbar) coupled to a television in the living room and a second playback device in the kitchen. While the user is watching television, accompanying audio can be transmitted from the first playback device to the wearable playback device for synchronous playback to the user. Later, the user may walk into the kitchen and wish to listen to different audio content, for example a news broadcast. To achieve this, the appropriate audio content (e.g., an audio stream of the news broadcast) can be transmitted from the second playback device to the wearable playback device for playback to the user. In various embodiments, transmission of audio content from the non-wearable playback device to the wearable playback device can be direct or may involve one or more intervening gateway devices.

While enabling a wearable playback device to receive audio content from multiple different audio source devices provides clear benefits to the user, this functionality can also present certain challenges. In particular, there remains a need to simplify the user experience with respect to setup of audio source devices to be used with a particular wearable playback device, as well as managing transitions between different audio source devices. As described in more detail below, in some examples, a wearable playback may operate in a first mode in which a first audio stream is received from a first audio source device (e.g., a first gateway device) and played back for the user. The wearable playback device may also operate in a second mode in which a second audio stream is received from a second audio source device (e.g., a second gateway device) and played back for the user.

During either or both of these modes, the wearable playback device may also operate as a hearing assistance device, for example by detecting and amplifying ambient sounds in the environment. In various examples, the wearable playback device can transition between the first and second modes based on user input (e.g., voice input, input via controller device such as a phone or tablet, via a user interface of the wearable playback device itself), or may transition automatically based on detected parameters or states. For example, the wearable playback device may automatically transition from the first mode to the second mode (or, alternatively, may prompt a user with the option of transitioning from the first mode to the second mode) based on a detected relative proximity of the various audio source devices, based on the relative signal strengths of the wireless signals from the audio source devices, based on user-selected defaults or other preferences, based on the particular content of the audio streams (e.g., transitioning to the second mode when the first audio stream is silence), or any other suitable input signal.

As described in more detail below, while enabling the use of a wearable playback device such as a hearing aid in an at-home or home theater listening context provides several advantages, coordinating between wearable and non-wearable playback devices present certain challenges to the user experience. By dynamically adapting between various operational modes both of wearable and non-wearable devices, the user listening experience can be improved.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
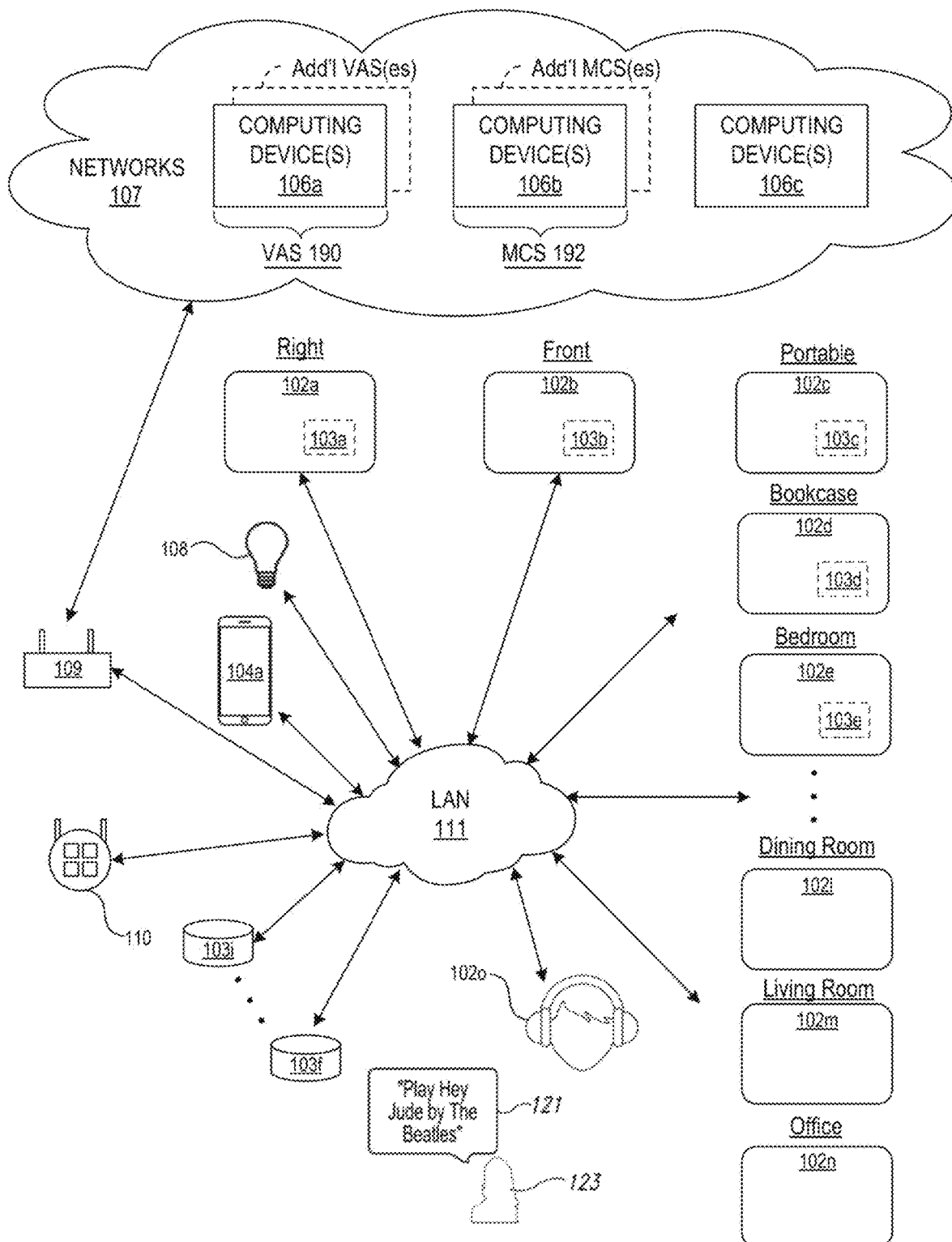
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-103i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a local network 111 that may include a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the local network 111. The local network 111 may be, for example, a network that interconnects one or more devices within a limited area (e.g., a residence, an office building, a car, an individual's workspace, etc.). The local network 111 may include, for example, one or more local area network (LANs) such as wireless local area networks (WLANs) (e.g., WI-FI networks, Z-WAVE networks, etc.) and/or one or more personal area networks (PANs) such as BLUETOOTH networks, wireless USB networks, ZIGBEE networks, and IRDA networks.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a voice assistant service ("VAS") and at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, NUANCE, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a-e include or are otherwise equipped with corresponding NMDs 103a-e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics.

For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over the local network 111 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. Patent Publication No. 2017-0242653 published Aug. 24, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. Patent Publication No. 2017-0242653.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Publication No. 2017-0242653.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the local network 111 (FIG. 1B) may be eliminated and the single playback device 102 and/or the single NMD 103 may communicate directly with the remote computing devices 106a-d. In some embodiments, a telecommunication network (e.g., an LTE network, a 5G network, etc.) may communicate with the various playback, network microphone, and/or controller devices 102-104 independent of the local network 111.

While specific implementations of MPSs have been described above with respect to FIGS. 1A and 1B, there are numerous configurations of MPSs, including, but not limited to, those that do not interact with remote services, systems that do not include controllers, and/or any other configuration as appropriate to the requirements of a given application.

a. Example Playback & Network Microphone Devices

Figure 2A:
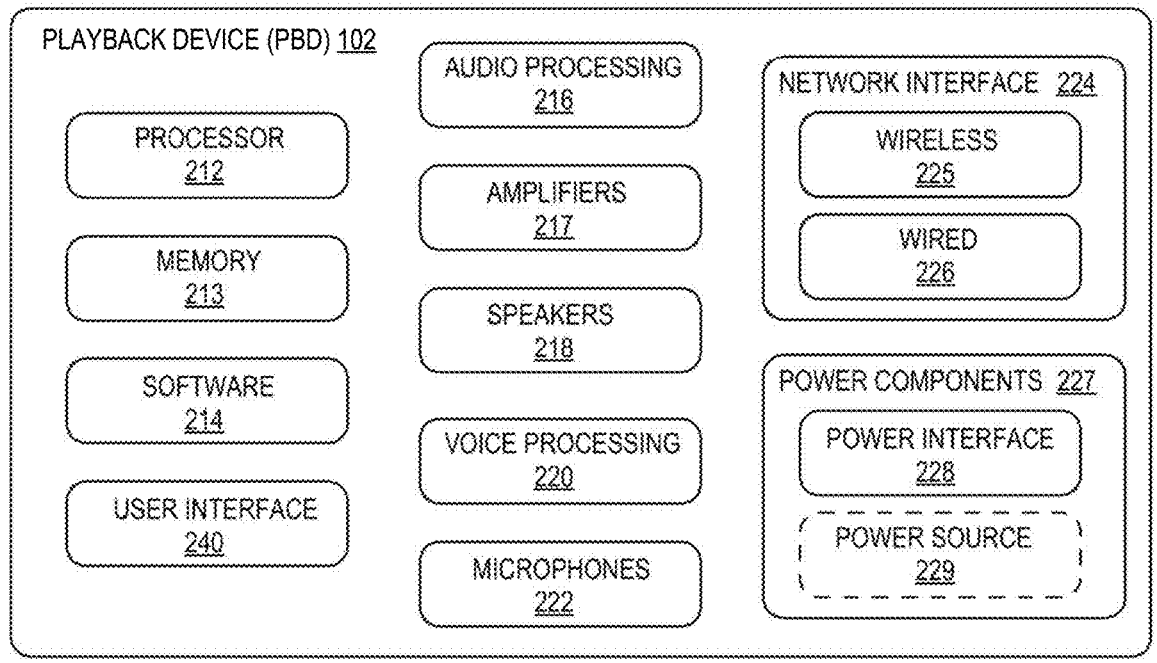
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, BLUETOOTH, 4G mobile communication standard, 5G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A includes both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously referenced U.S. Patent Publication No. 2017/0242653.

As further shown in FIG. 2A, the playback device 102 also includes power components 227. The power components 227 may include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." Those portable playback devices that weigh no more than fifty ounces (e.g., between three ounces and fifty ounces, between five ounces and fifty ounces, between ten ounces and fifty ounces, between ten ounces and twenty-five ounces, etc.) may be referred to herein as an "ultra-portable playback device." Those playback devices that operate using an external power source instead of an internal power source may be referred to herein as a "stationary playback device," although such a device may in fact be moved around a home or other environment.

The playback device 102 may further include a user interface 231 that may facilitate user interactions independent of or in conjunction with user interactions facilitated by one or more of the controller devices 104. In various embodiments, the user interface 231 includes one or more physical buttons and/or supports graphical interfaces provided on touch sensitive screen(s) and/or surface(s), among other possibilities, for a user to directly provide input. The user interface 231 may further include one or more of lights (e.g., LEDs) and the speakers to provide visual and/or audio feedback to a user.

Figure 2B:
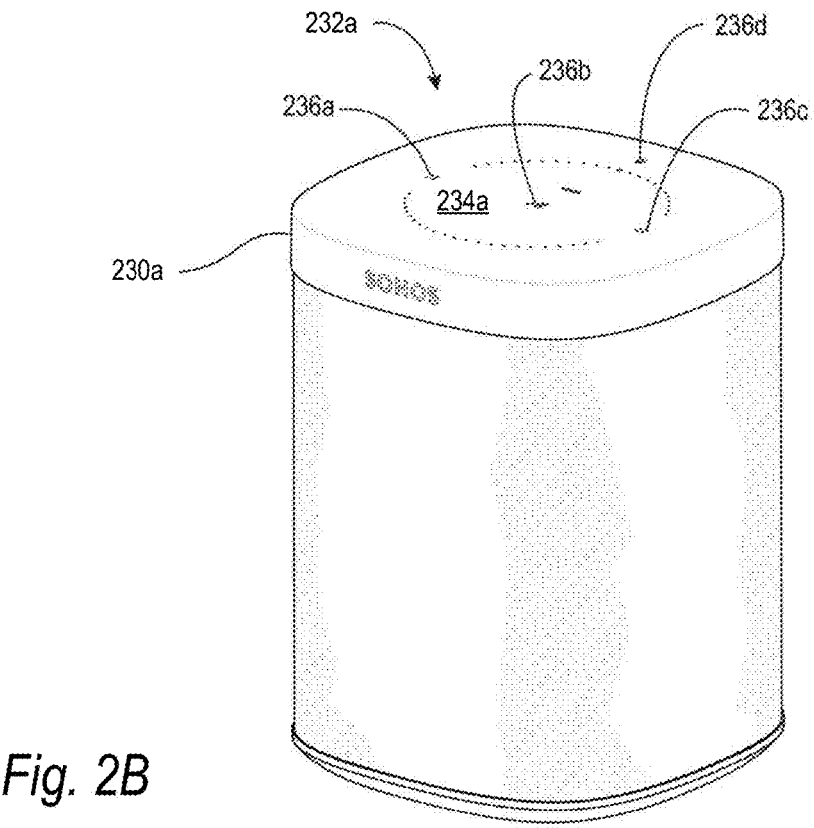
FIG. 2B is an isometric diagram of an example housing of the playback device of FIG. 2A.

As an illustrative example, FIG. 2B shows an example housing 230a of the playback device 102 that includes a user interface in the form of a control area 232 at a top portion 234 of the housing 230a. The control area 232a includes buttons 236a, 236b, and 236c for controlling audio playback, volume level, and other functions. The control area 232a also includes a button 236d for toggling the microphones 222 to either an on state or an off state.

As further shown in FIG. 2B, the control area 232a is at least partially surrounded by apertures formed in the top portion 234a of the housing 230a through which the microphones 222 (not visible in FIG. 2B) receive the sound in the environment of the playback device 102. The microphones 222 may be arranged in various positions along and/or within the top portion 234a or other areas of the housing 230a so as to detect sound from one or more directions relative to the playback device 102.

Figure 2C:
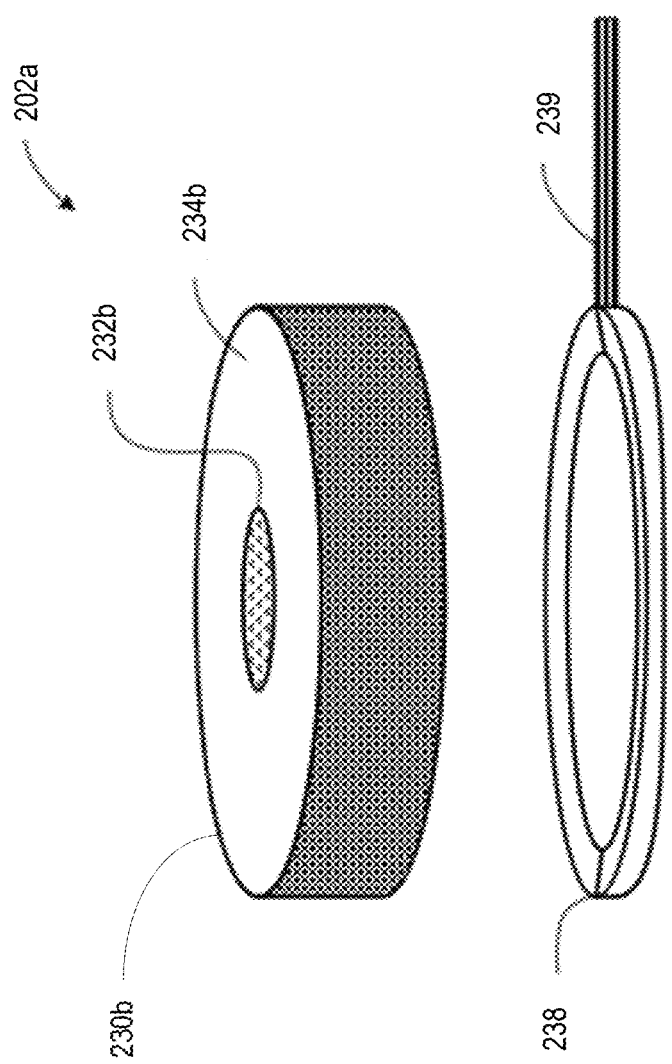
FIG. 2C is a diagram of another example housing for the playback device of FIG. 2A.

As mentioned above, the playback device 102 may be constructed as a portable playback device, such as an ultra-portable playback device, that comprises an internal power source. FIG. 2C shows an example portable playback device 202a. The portable playback device 202a is similar to the playback device 102, albeit configured for relatively more portable operation.

The portable playback device 202a includes a housing 230b. As shown, similar to the playback device 102, the housing 230b of the portable playback device 202a includes a user interface in the form of a control area 232b at a top portion 234b of the housing 230b. The control area 232b may include a capacitive touch sensor for controlling audio playback, volume level, and other functions.

The housing 230b of the portable playback device may be configured to engage with a dock 238 that is connected to an external power source via cable 239. The dock 238 may be configured to provide power to the portable playback device to recharge an internal battery. In some embodiments, the dock 238 may comprise a set of one or more conductive contacts (not shown) positioned on the top of the dock 246 that engage with conductive contacts on the bottom of the housing 230b (not shown). In other embodiments, the dock 238 may provide power from the cable 239 to the portable playback device 202a without the use of conductive contacts. For example, the dock 238 may wirelessly charge the portable playback device 202a via one or more inductive coils integrated into each of the dock 238 and the portable playback device 202a.

Figure 2D:
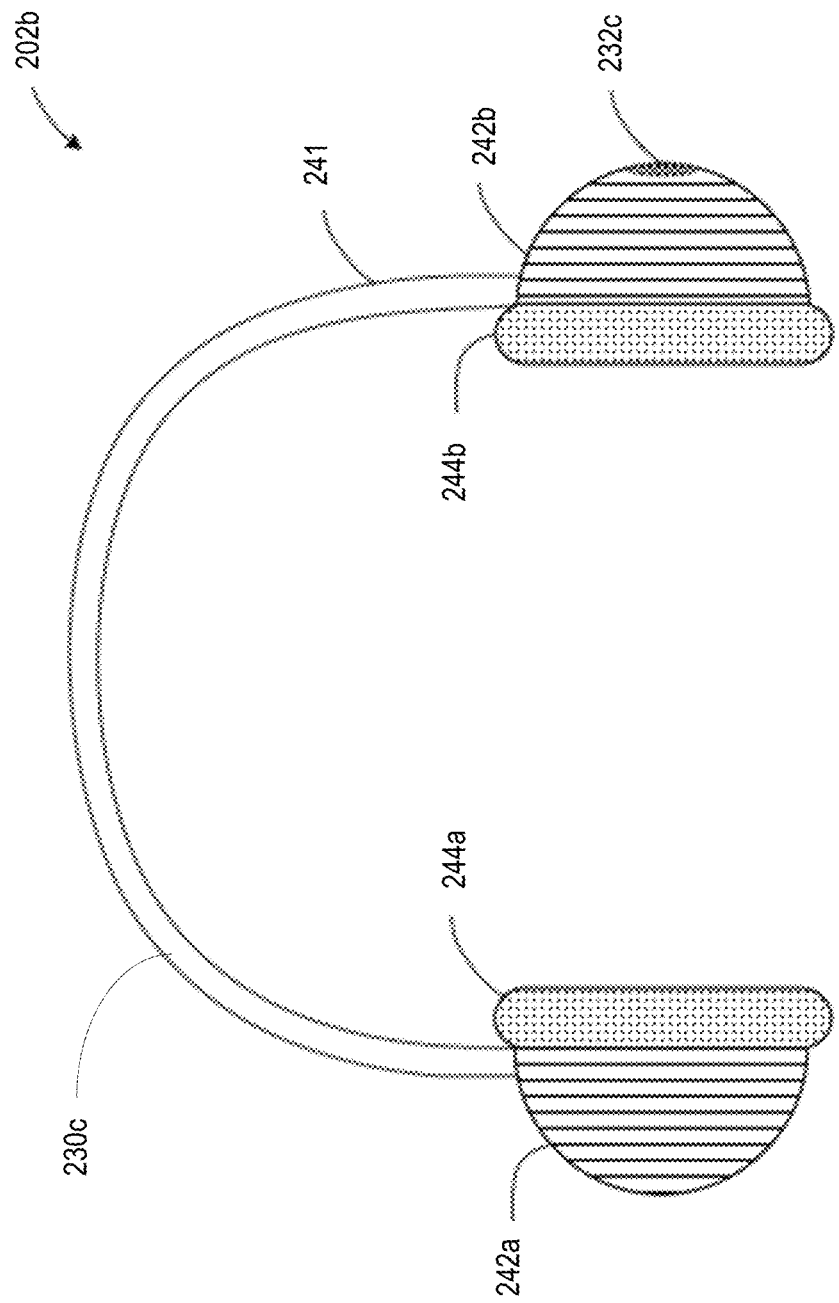
FIG. 2D is a diagram of another example housing for the playback device of FIG. 2A.

In some embodiments, a portable playback device may take the form of a wired and/or wireless headphone (e.g., an over-ear headphone, an on-ear headphone, or an in-ear headphone). For instance, FIG. 2D shows an example headphone 202b. Like the portable playback device 202a, the headphone 202b is similar to the playback device 102, albeit configured in a different form factor.

The headphone 202b includes a housing 230c. As shown, the housing 230c includes a headband 241 that couples a first earpiece 242a to a second earpiece 242a (referred to collectively as the earpieces 242). Each of the earpieces 242 may house any portion of the electronic components in the headphones 202b, such as one or more speakers.

Further, one or more of the earpieces 242 may include a control area 232c for controlling audio playback, volume level, and other functions. The control area 232c may comprise any combination of the following: a capacitive touch sensor, a button, a switch, and a dial. As shown in FIG. 2D, the 230c may further include ear cushions 244a and 244b that are coupled to earpieces 242a and 242b, respectively. The ear cushions 244a and 244b may provide a soft barrier between the head of a user and the earpieces 242, respectively, to improve user comfort and/or provide acoustic isolation from the ambient (e.g., passive noise reduction (PNR)). In some implementations, the wired and/or wireless headphones 202b may be ultra-portable playback devices that are powered by an internal energy source and weigh less than fifty ounces.

Figure 2E:
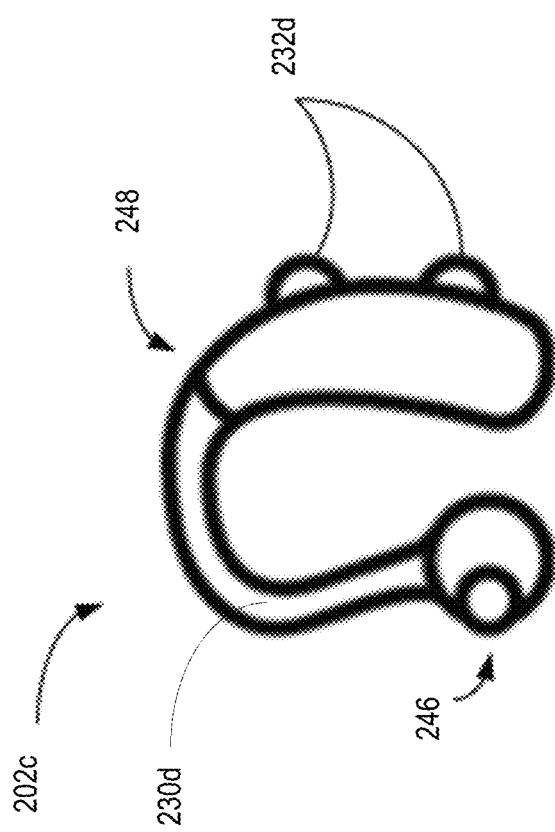
FIG. 2E is a diagram of another example housing for the playback device of FIG. 2A.

In some embodiments, the playback device 102 may take the form of an in-ear headphone or hearing-aid device. For instance, FIG. 2E shows an example hearing aid 202c. Like the portable playback device 202a and the headphones 202b, the hearing aid 202c is similar to the playback device 102, albeit configured in a different form factor.

The hearing aid 202c includes a housing 230d. As shown, the housing 230d includes an in-ear portion 246 configured to be disposed in or adjacent a user's ear, and an over-ear portion 248 configured to extend over and behind a user's ear. The housing 230d may house any portion of the electronic components in the playback device, such as one or more audio transducers, microphones, and audio processing components.

A plurality of control areas 232d can facilitate user input for controlling audio playback, volume level, noise cancellation, pairing with other devices, and other functions. The control area 232d may comprise any combination of the following: one or more buttons, switches, dials, capacitive touch sensors, etc. As discussed in more detail below, in some embodiments a playback device 202c such as that shown in FIG. 2E can function in a first mode as a hearing aid (e.g., by amplifying ambient sounds to improve the user's perception of audio in the surrounding environment) and can function in a second mode as an audio playback device (e.g., by playing back audio content received from an external source device, such as audio accompanying a movie synchronously displayed via a video display device).

It should be appreciated that the portable playback devices 202 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, a portable playback device 202 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

While specific implementations of playback and network microphone devices have been described above with respect to FIGS. 2A, 2B, 2C, 2D, and 2E, there are numerous configurations of devices, including, but not limited to, those having no UI, microphones in different locations, multiple microphone arrays positioned in different arrangements, and/or any other configuration as appropriate to the requirements of a given application. For example, UIs and/or microphone arrays can be implemented in other playback devices and/or computing devices rather than those described herein. Further, although specific example of playback devices 102 and 202 is described with reference to MPS 100, one skilled in the art will recognize that playback devices as described herein can be used in a variety of different environments, including (but not limited to) environments with more and/or fewer elements, without departing from this invention. Likewise, MPSs as described herein can be used with various different playback devices.

By way of illustration, SONOS, Inc. presently offers (or has offered) for sale certain playback devices that may implement certain of the embodiments disclosed herein, including a "SONOS ONE," "PLAY:1," "PLAY:3," "PLAY:5," "PLAYBAR," "AMP," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A, 2B, 2C, or 2D or to the SONOS product offerings. For example, a playback device may be integral to another device or component such as a television, a lighting fixture, or some other device for indoor or outdoor use.

b. Example Playback Device Configurations

Figure 3B:
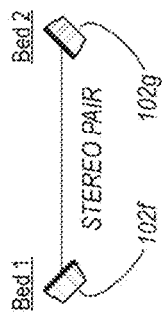
FIGS. 3A, 3B, 3C, 3D, and 3E are diagrams showing example playback device configurations in accordance with aspects of the disclosure.
Figure 3C:
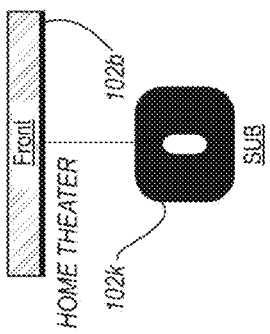
Figure 3D:
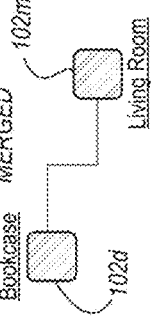
Figure 3E:
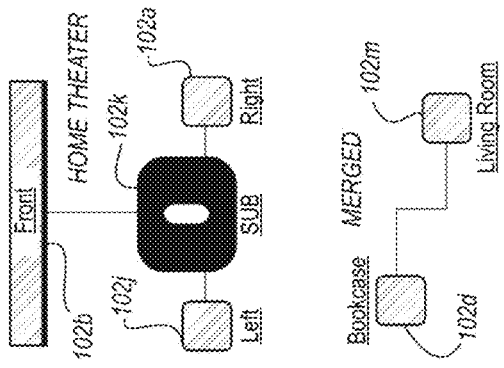
Figure 3A:
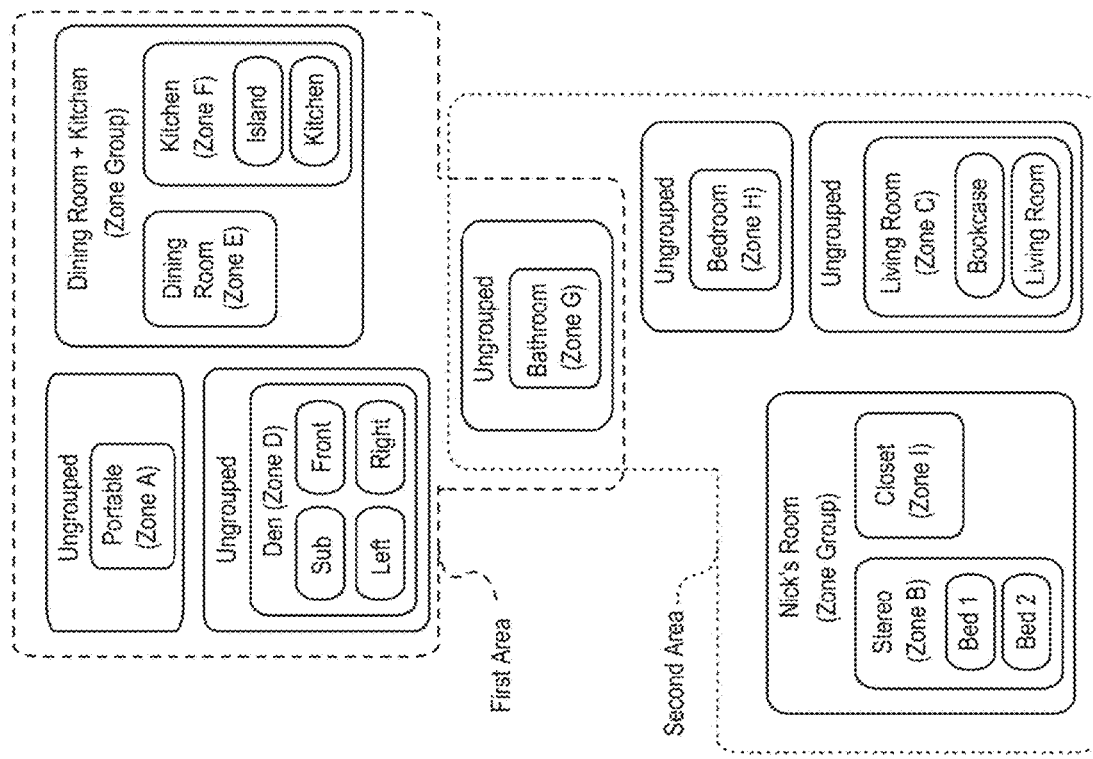

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. Patent Publication No. 2017-0242653. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. Patent Publication No. 2018-0107446 published Apr. 19, 2018 and titled "Room Association Based on Name," and U.S. Pat. No. 8,483,853 filed Sep. 11, 2007, and titled "Controlling and manipulating groupings in a multi-zone media system," each of which is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone. For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Controller devices in accordance with several embodiments of the invention can be used in various systems, such as (but not limited to) an MPS as described in FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 may be configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 may also include a user interface 440 that is generally configured to facilitate user access and control of the MPS 100. The user interface 440 may include a touch-screen display or other physical interface configured to provide various graphical controller interfaces, such as the controller interfaces 440a and 440b shown in FIGS. 4B and 4C. Referring to FIGS. 4B and 4C together, the controller interfaces 440a and 440b include a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments, audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

III. Example Wearable Audio Playback Devices

Wearable audio playback devices, such as hearing instruments or headphones (e.g., over-the-ear, around-the-ear, or in-ear headphones), can offer private listening experiences in which the audio presented to the user is not audible to others nearby. However, in some multi-device environments, such as in the home theater context, it can be beneficial to coordinate playback between wearable and non-wearable playback devices. This can be particularly true of wearable devices, such as hearing aids, that amplify ambient sound to improve audio perception for users who have hearing impairment.

Conventional hearing aids detect audio input from the surrounding environment and play back an amplified form of the audio via transducers within or adjacent the user's ear. Typically, the audio is amplified according to a frequency profile based on the user's specific hearing needs. In instances in which a hearing aid user wishes to listen to audio content, such as music, television or movie audio, radio, podcasts, etc., the user's experience can be improved by providing such media content directly to the hearing aid. For example, the hearing aid can wirelessly receive audio content (e.g., an audio stream) from a source device. The hearing aid can then play back the audio content via transducers, without relying on amplification of sounds in the environment. The hearing aid can, similarly, play back the audio content with emphasis on certain frequencies or frequency ranges according to the frequency profile of the user.

As such, in some embodiments a wearable playback device can operate in multiple modes, including at least a first mode in which ambient sounds are amplified for the user, and a second mode in which external audio content (e.g., an audio stream received from a source device) is played back via transducers of the wearable playback device. In some examples, a wearable device operating in the second mode can be used in a home theater environment, which optionally can include the synchronous play back of audio content via one or more non-wearable playback devices (e.g., a soundbar, surround-sound devices, etc.). In this configuration, a hearing-aid user and user without a hearing aid can share a listening experience, such as watching a movie or listening to music together.

In some embodiments, while in the second mode, the wearable playback device continues to amplify ambient sounds in the environment, for example allowing the user to have a conversation with a fellow movie-watcher while still receiving the audio content accompanying the movie. In some instances, this amplification of ambient sounds can exclude (e.g., filter, suppress, or remove) the synchronous audio playback corresponding to the audio already being played back via the wearable playback devices. For example, the movie audio played back via a soundbar may not be amplified by the wearable playback device, and precluding this amplification can avoid undesirable echo effects or a diminution in audio quality. In these and other instances, it can be useful to coordinate between wearable and non-wearable playback devices.

Figure 5A:
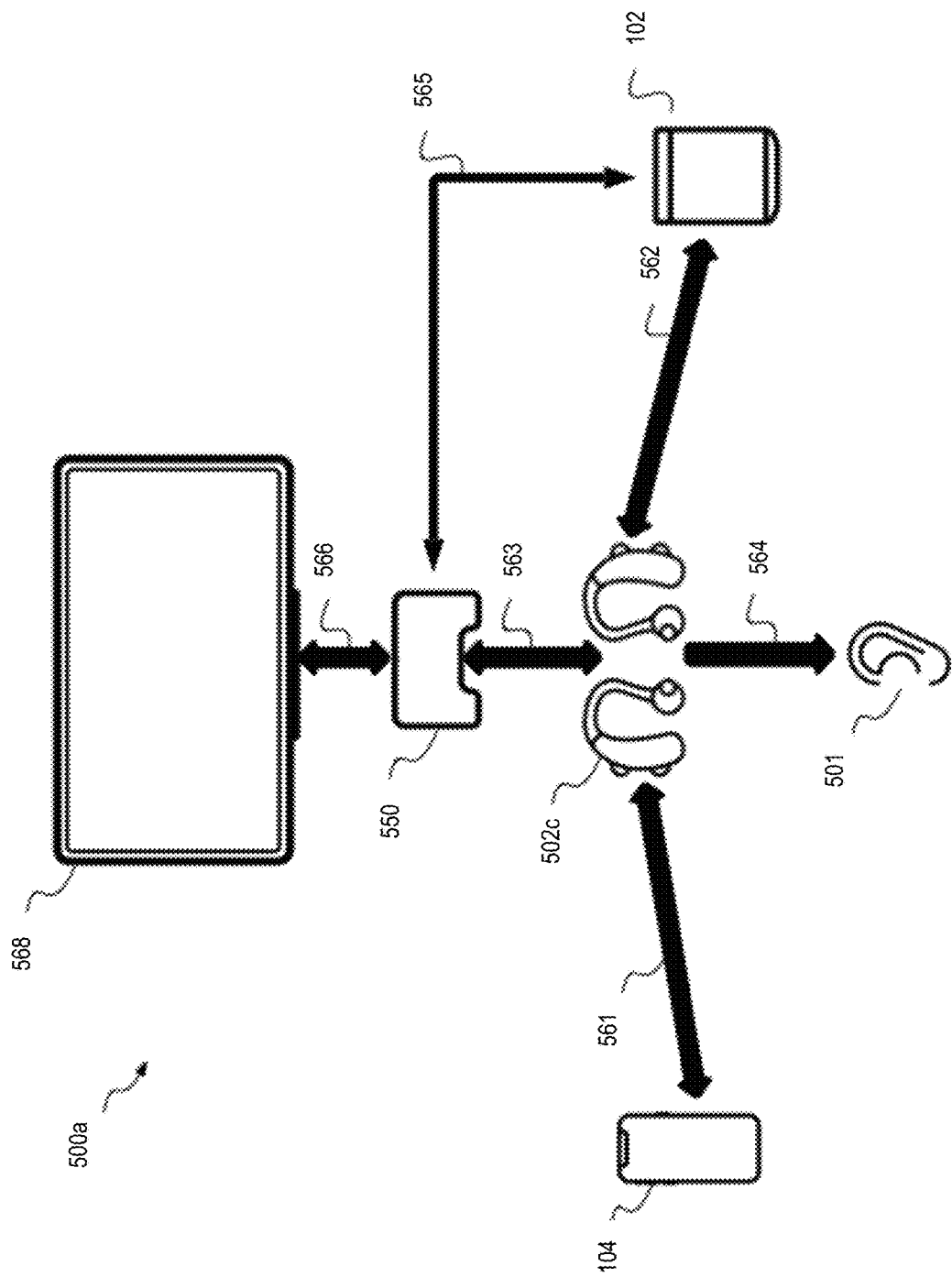
FIG. 5A is a schematic illustration of an environment including a wearable playback device in communication with a plurality of external devices.

FIG. 5A is a schematic illustration of a distributed audio playback environment 500a that includes a user 501 outfitted with a wearable playback device 502c, which may be the same or similar to the playback device 202c. That is, the wearable playback device 502c can be, for example, a hearing aid configured to provide improved audible perception for a user with hearing impairment or a wearable type playback device configured to allow streaming of media to the device and playback of media by the device while also having a hearing enhancing function, as illustrated by the hearing aid 202c described above. Additionally or alternatively, the wearable playback device 502c can be headphones (e.g., over-ear or in-ear headphones) or any other suitable configuration, as illustrated by the headphones 202b and other wearable playback devices described above.

In some embodiments, the wearable playback device 502c can operate in a plurality of modes. For example, in a first mode, the wearable playback device 502c can amplify ambient audio, in the manner of a conventional hearing aid or other such device. In a second mode, the wearable playback device 502c can play back audio received from one or more external source devices. For example, the source devices can transmit audio content (e.g., music, podcasts, audio accompanying video content, etc.) to the wearable playback device 502c. Such transmission can be wired or wireless, for example transmitted over a BLUETOOTH or Wi-Fi connection. The wearable playback device 502c can switch between the first mode and the second mode in response to user input (e.g., pushing a mode button) on the wearable playback device 502c or on a controller of the wearable playback device 502c.

In the environment 500a shown in FIG. 5A, the source devices include a controller device 104 such as a smartphone, a non-wearable playback device 102, a gateway device 550, and a video display device 568. The non-wearable playback device 102 can be, for instance, any one of the playback devices 102a-102o as previously described herein, as well as other non-wearable playback devices.

In various embodiments, communication between these devices can be unidirectional or can be bidirectional. For instance, with unidirectional communication, the communication may transmit from the source devices to the wearable playback device 502c. With the bidirectional communication, the communication may involve the wearable playback device 502c both transmitting data to and receiving data from the source device(s).

More specifically, in the unidirectional configurations, the wearable playback device 502c can receive audio to play back or amplify from the controller device 104 via a first communication path 561, from the non-wearable playback device 102 via a second communication path 562, or from the gateway device 550 via a third communication path 563. The first communication path 561 between the wearable device 502c and the controller device 104 can be, for example, a wireless connection (e.g., Bluetooth or Wi-Fi). The second communication path 562 between the wearable device 502c and the non-wearable device 102 may be an acoustic path where the wearable device 502c receives the audio being played back by the non-wearable device 102 via microphones built into the wearable device 502c for amplification and/or a wireless connection (e.g., Bluetooth, Wi-Fi) where the wearable device 502c receives audio data that is processed by the wearable device 502c for playback or rendering of the audio data to the user 501. The third communication path 563 can be a wireless connection (e.g., Bluetooth, Wi-Fi) where the wearable device 502c receives audio data that is processed by the wearable device 502c for playback or rendering of the audio data to the user 501 via path 564.

In bidirectional configurations, operation of the wearable playback device 502c can be at least partially controlled via one or more of the source devices. For example, the user may provide input via the controller device 104, non-wearable playback device 102, and/or gateway device 550 that controls operation of the wearable playback device 502c, such as adjusting a volume level, grouping or ungrouping the wearable playback device 502c with other playback devices, or any other operations of the wearable playback device 502c. The input may be communicated to the wearable device 104 via any or all of the paths 561, 562, 563, or 564.

In some embodiments, the wearable device 502c may receive audio simultaneously or concurrently for playback or rendering by the wearable device 502c. The wearable device 502c may playback the received audio while also amplifying ambient audio which may include audio received from the non-wearable playback device 102. Examples of the received audio include music, podcasts, Internet radio, and/or television audio.

The gateway device 550 can include data storage, one or more processors, one or more inputs (e.g., buttons, switches, dials, capacitive touch sensors, etc.), and wired and/or wireless communications components. In operation, the gateway device 550 can facilitate transmission of audio from an external source device (e.g., a video display device, a non-wearable playback device such as a soundbar, etc.) to the wearable playback device 502c. In the illustrated example, the gateway device 550 is coupled via an input interface 566 (e.g., via wired or wireless connection) to the video display device 568 (e.g., a television, projector, or other suitable video display device). Alternatively, the gateway device 550 can be integrated within and form a part of the video display device 568 or the non-wearable playback device 102.

In operation, the gateway device 550 can obtain audio content from the video display device 568 via the input interface 566 (e.g., Wi-Fi, Bluetooth, line-in port, optical port, HDMI, etc.) and transmit the audio content to the wearable playback device 502c for playback to the user 501. Such audio content can be, for example, audio accompanying video content that is simultaneously played back via the video display device 568, such as audio accompanying a movie or television show. As noted elsewhere herein, in some embodiments such audio can be simultaneously transmitted (e.g., via the gateway device 550) to the wearable playback device 502c and also played back via one or more other non-wearable playback devices 102 (e.g., a soundbar, speakers integrated with the video display device 568, surround-sound playback devices, etc.).

In some embodiments, the gateway device 550 can receive the audio from a non-wearable playback device 102 via a fourth communication path 565 or transmit audio for synchronous playback with the non-wearable playback device 102 via the fourth communication path 565. For instance, the gateway device may receive or transmit the audio when the gateway device 550 and the non-wearable playback device 102 are grouped for synchronous playback or when the gateway device 550 is bonded to the non-wearable playback device 102. In some embodiments, the gateway device 550 can retrieve audio for playback over the Internet from a media streaming service provider.

In some embodiments, a scene or saved group may be used or invoked when audio data is received for playback by the gateway device 550. For example, a scene or saved group may be a preset group of devices such as the gateway device 550 and non-wearable playback device 102. When the saved group is active or enabled, playback of audio occurs synchronously between the gateway device 550 and non-wearable playback device 102. The gateway device 550 may be able to detect when audio is received for playback via any of input interface 566, communication path 565 or retrieved from a media streaming service provider for playback. In response to the gateway device 550 being engaged for audio playback, the gateway device 550 may activate a scene or saved group. The activation of the scene may be limited to only scenes including at least the gateway device 550.

In some embodiments, the video display device 568, the gateway device 550, or any other device in the environment may be associated with a remote-control device, which may likewise provide inputs to the wearable playback device 502c to control or modify its operation. Such inputs can be received directly by the wearable playback device 502c, or alternatively may be routed through one or more of the source devices such as the gateway device 550.

Figure 5B:
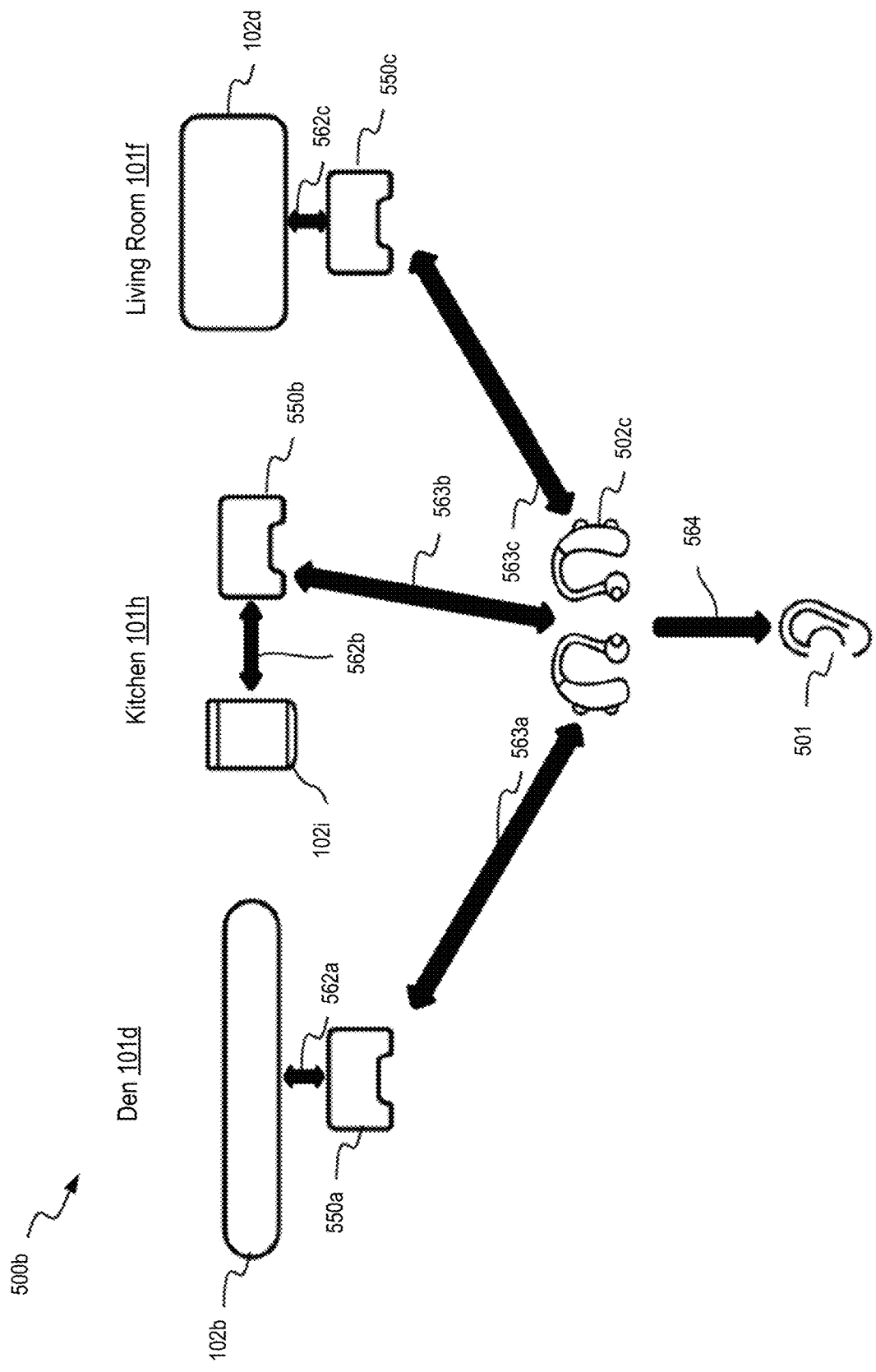
FIG. 5B is a schematic illustration of another example environment including a wearable playback device in communication with a plurality of external devices.

FIG. 5B is a schematic illustration of an example environment 500b that includes a user 501 outfitted with the wearable playback device 502c (e.g., a hearing aid or other suitable wearable device). As shown in FIG. 5B, the environment 500b includes illustrative rooms of the media playback system 100 (FIG. 1A). In particular, the environment 500b includes the Den 101d having a first non-wearable playback device 102b coupled to a first gateway device 550a via communication path 562a, the Kitchen 101h having a second non-wearable playback device 102i coupled to a second gateway device 550b via a communication path 562b, and the Living Room 101f having a third non-wearable playback device 102d coupled to a third gateway device 550c via communication path 562c. The non-wearable playback devices 102, gateway devices 550, and communication paths 562 can include some or all of the features of the playback devices 102, gateway device 550, and communication paths described previously herein with respect to FIG. 5A as well as the other Figures.

With continued reference to FIG. 5B, the playback device 102b and the first gateway device 550a can together serve as a first audio source device for transmitting a first audio stream to the wearable playback device 502c via a communication path 563a. Similarly, the playback device 102i and the second gateway device 550b can serve as a second audio source device for transmitting a second audio stream to the wearable playback device 502c via a communication path 563b. And the playback device 102d and the third gateway device 550c can serve as a third audio source device for transmitting a third audio stream to the wearable playback device 502c via communication path 563c. The communication paths 563 can be wireless (e.g., Bluetooth, Wi-Fi, or other suitable wireless transmission protocol).

Although FIG. 5B illustrates discrete gateway devices 550 coupled to discrete playback devices 102, in various embodiments some or all of the playback devices 102 can have a gateway device integrated therein (e.g., housed within a common enclosure or otherwise integrally formed). Additionally or alternatively, some or all of the playback devices 102 can be configured to transmit audio content (e.g., an audio stream) or other data directly to the wearable playback device 502c, without the use of intervening gateway devices 550.

In operation, the user 501 may wish to receive audio content from different source devices at different times. For example, while in the Den 101d, the user 501 may wish to listen to audio content via the playback device 102b, which may take the form of a soundbar coupled to a television. Accordingly, a first audio stream (e.g., audio accompanying a television show) can be transmitted via communication path 563a to the wearable playback device 502c for playback to the user 501.

At a later time, the user 501 may wish to listen instead to audio from a different audio source device. For example, as the user 501 walks from the Den 101d to the Kitchen 101h, the user 501 may wish to cease listening to the first audio stream (e.g., audio accompanying a television show) and instead listen to a second audio stream received via communication path 563b from the playback device 102i and/or the second gateway device 550b located in the Kitchen. The second audio stream may be, for example, a news broadcast or any other suitable audio content.

At still a later time, the user 501 may move to the Living Room 101f and wish to listen to a third audio stream received via communication path 563c from the playback device 102d and/or the third gateway device 550c located in the Living Room 101f. The illustrated example depicts a user moving about within a household, however various other environments are possible. For example, a wearable playback device user in a sports bar with multiple different televisions showing different games may wish to transition between receiving audio content associated with a first television showing a basketball game to receiving audio content associated with a second television showing a football game.

Conventionally, a user may be required to physically interact with a gateway device 550 to transition between different audio sources, for example by pressing a button on a gateway device to activate an associated audio stream and begin transmission of an audio stream from that gateway device to the wearable playback device 502c. However, in instances in which the gateway device(s) 550 are part of a media playback system 100 as described previously herein, the process of connecting a wearable playback device 502c to one or more gateway devices 550 (or other audio source devices) can be improved. Additionally, the process of managing the interaction between the wearable playback device 502c and multiple different gateway devices 550 (or other audio source devices) can be improved.

According to some examples, a gateway device 550 can be associated with one or more playback devices in a manner similar to bonded or paired playback devices as described elsewhere herein. For example, the first gateway device 550a can be associated with the playback device 102b such that audio played back via the first playback device 102b is automatically transmitted to the first gateway device 550a. Moreover, in some embodiments, the first playback device 502b and the first gateway device 550a can be grouped together in a user interface (e.g., as presented via a controller device 104), such that the two devices are controlled together. For example, transport commands, volume control, grouping with other playback devices 102, and other such commands initiated via a controller device may affect the playback device 102b and the first gateway device 550a together. In some embodiments, at least some such controls can be individualized, for example by allowing a different volume setting for the first gateway device 550a than for the playback device 102b.

During setup of a gateway device 550, the user 501 may associate the particular gateway device 550 with a particular playback device 102 (or with multiple playback devices that are bonded together, as illustrated in FIGS. 3B-3D). This association can be at least partially automatic based on a physical connection between the gateway device 550 and the particular playback device 102, such as connecting the two devices with a cable. In such instances, during setup the gateway device 550 can be automatically named or assigned a default name corresponding to the associated playback device 102. In other examples, the gateway device 550 may be wirelessly coupled to a particular playback device 102, in which case the association can be assigned using a controller device or other suitable pairing approach.

In some instances, it may be desirable to provide independent volume control for the gateway devices 550 and/or the wearable playback device 502c such that adjusting (e.g., increasing or decreasing) the volume of a non-wearable playback device 102 (e.g., a soundbar playback device) might not necessarily adjust the volume of the wearable playback device 502c. For example, while the wearable playback device 502dc is connected to the first gateway device 550a and/or the playback device 102b in the Den 101d, a volume setting for the Den 101d group or zone may not control the volume of the wearable playback device 502c. In some embodiments, the volume setting of the wearable device 502c can be entirely independent, for example being independently controlled via settings on the device itself (e.g., buttons, dials), via a separate remote, the gateway device 550a, or other such input device.

In some embodiments, the volume setting of the wearable playback device 502c can be only partially controlled via the volume setting of the group. For example, there may be lower (e.g., 25% volume level) and upper (e.g., 75% volume level) thresholds between which the group volume level may control the wearable playback device 502c volume level. Outside of these thresholds, changing the group volume level may not further change the wearable playback device volume level (e.g., turning the group volume up to 90% would result in the wearable playback device volume level being set to 75%). This or similar approaches can be used to safeguard the user of wearable playback devices from the volume being turned excessively high or excessively low, which can be particularly problematic for users of wearable devices such as hearing aids.

In some embodiments, whether a volume-adjustment signal (e.g., as provided by a controller device 104, input on a grouped non-wearable playback device 102, etc.) modifies a volume setting of the wearable playback device 502c depends on context data. For example, whether there are one or more users present (e.g., if the only user present is wearing the wearable playback device 502c, then a volume-adjustment signal modifies the volume of the wearable playback device 502c, but if there are multiple users present, then a volume-adjustment signal does not modify the volume of the wearable playback device 502c). Additional examples of such context data include a user gesture, a direction or orientation of a controller device 104 providing the volume-adjustment signal, accompanying voice input, etc.

In various examples, a user may adjust volume settings associated with control of the volume level of the wearable playback device 502c, for example via a controller device 104, gateway device 550, or other suitable device. For example, a user may choose to "lock" a volume setting such that volume of the wearable playback device 502c is always controlled with the group volume, or alternatively is always controlled independently of group volume.

According to some examples, when a wearable playback device 502c is associated with an MPS 100, the wearable playback device 502c may only be controllable via a particular controller device. For example, if multiple different users of an MPS 100 each have a separate controller device (e.g., a phone or tablet), it may be useful to limit control of the wearable playback device 502c to a controller device associated with the user of the wearable playback device 502c. This can preclude, for example, a child inadvertently increasing the volume of his grandfather's hearing aid. In various embodiments, the wearable playback device 502c may not be visible at all on the user interface for certain controller devices, or the wearable playback device 502c may be visible but may not be adjustable via the user interface for certain controller devices.

As noted previously, in some instances a user 501 may wish to dynamically switch between different audio sources for playback via the wearable playback device 502c. In various examples, the wearable playback device 502c can transition between different modes in which it receives audio content from different audio sources devices. For example, in a first mode, the wearable playback device 502c receives a first audio stream from the playback device 102b via the first gateway device 550a in the Den 101d, in a second mode, the wearable playback device 502c receives a second audio stream from the playback device 102i and the second gateway device 550b in the Kitchen 101h, and in a third mode the wearable playback device 502c receives a third audio stream from the playback device 102d via the third gateway device 550c in the Living Room 101f.

In some embodiments, the wearable playback device 502c can transition between two or more modes based at least in part on an input signal received at the wearable playback device 502c. The input signal can include a parameter that indicates a proximity of a particular audio source device to the wearable playback device 502c, such that as a user moves further away from a first audio source device (e.g., first gateway device 550a) and nearer to a second audio source device (e.g., the second gateway device 550b), the wearable playback device 502c may automatically transition (or may automatically surface an appropriate user prompt) to a different mode to receive an audio stream from the second audio source device. This proximity can be determined using any suitable technique, for example sonic localization (e.g., detecting, via the wearable playback device 502c, sound emitted from the various audio source devices and determining a distance based on the time that the sound(s) are detected or magnitude of the sound received), signal strength measurements (e.g., comparing the relative wireless signal strengths from different audio source devices), optical localization, or any other suitable proximity sensing technique.

In some embodiments, the input signal can include a user's voice input. For example, a user can speak a command such as "switch to the Living Room," optionally with a preceding action to activate or wake-up the voice-detection functionality of the wearable playback device 502c. Such wake-up actions can include speaking an appropriate wake-word, pressing a button on the wearable playback device 502c or other device within the MPS 100, or any other suitable action.

In some embodiments, the input signal that causes the wearable playback device 502c to transition from one mode to another (or to output an appropriate user prompt offering to transition from one mode to another) can be based at least in part on a content parameter of an audio stream. For example, at a first time, the wearable playback device 502c receives may receive active audio stream from the playback device 102*b* (via the first gateway device 550*a*). Then, at a later time, the first audio stream can cease to provide any audio content for playback (e.g., playing back silence), for example in the case that the television coupled to a soundbar has been turned off. In such instances, because the audio content is silent (or has some other parameter as detected by the wearable playback device 502*c*), the wearable playback device 502*c* can automatically transition to another mode to receive and play back an audio stream from another audio source device.

In at least some instances, certain audio source devices can be associated with user preferences or other default settings. For example, the playback device 102*b* may be set as the user's default audio source device, in which case the wearable playback device 502*c* receives the first audio stream from the playback device 102*b* (via the first gateway device 550*a*) unless and until a user actively selects another audio source device or some other condition causes the wearable playback device 502*c* to automatically transition to another mode for playback of a different audio stream associated with a different audio source device. In various embodiments, such user preferences, defaults, rankings, etc. can be provided and manipulated via a controller device, a user's voice input, or other such user interaction.

In some embodiments, the wearable playback device 502*c* can cause a user prompt to be output, for example to alert the user that a different audio source device and/or a different audio stream is available. For example, the wearable playback device 502*c* may be receiving the first audio stream from the first gateway device 550*a*, and while receiving the first audio stream, the second gateway device 550*b* may begin receiving audio from playback device 102*i*. The second gateway device 550*b* may transmit a message indicating to the first gateway device 550*a* or the wearable playback device 502*c*, via a network connection, that the second gateway device has an active playback session available. Because the wearable playback device 502*c* is already playing back audio from the first gateway device 550*a*, the wearable playback device 502*c* may continue uninterrupted playback of the first audio stream, and a user prompt can be played by the wearable playback device 502*c* to alert the user that another gateway device has an active playback session. In response to user input, the wearable playback device 502*c* could switch to receiving an audio stream from the second gateway device 550*b*. The user input could be a button selection on the wearable playback device 502*c*, the first gateway device 440*a*, or the second gateway device 550*b*.

In some embodiments, the user 501 can also respond to the user prompt by providing user input. As described in more detail elsewhere herein, both the user prompt and the user input can take a variety of forms.

In some embodiments, a user prompt can be output at least partially in response to receiving an input signal as noted previously. According to some embodiments, the user prompt can include audible output that indicates an available audio stream that the user 501 may choose to enable. The audible output can be non-vocal (e.g., chimes, tones, beeps, etc.) or can include vocal guidance. For example, vocal guidance can include audio output via the wearable playback device 502*c* (or another playback device) in the form of pre-recorded speech or computer-generated audio resembling speech (e.g., text-to-speech output). As one example, the user prompt can include playing back the phrase "audio stream available from the Den 101*d*, would you like to activate?"

In some embodiments, the user 501 may provide responsive user input in the form of a voice input. For example, the user's speech can be detected (e.g., via microphone(s) of the wearable playback device 502*c*) and processed to detect one or more keywords (e.g., via a keyword engine of the wearable playback device 502*c* or of another device within the MPS 100) or otherwise processed to determine a user intent (e.g., using natural language understanding (NLU) or other suitable technique).

According to some embodiments, the user prompt can take the form of a notification output via a controller device 104 (e.g., displayed via a UI of the controller device), or a notification output via another device within the MPS 100 (e.g., output via another playback device 102). In some instances, the user input can be provided via a controller device 104 (e.g., by interacting with the UI of the controller device 104) or via another playback device 102 (e.g., physically pressing buttons of another playback device 102, providing voice input to another playback device 102 or an NMD 103, etc.). Additionally or alternatively, the user prompt can include vibration or other tactile output via the wearable playback device 502*c*. In these and other configurations, such a user prompt can alert a user that an audio stream is available to be activated. Based on user input or other parameters, the wearable playback device 502*c* can transition to an appropriate mode such that a new audio stream is received at the wearable playback device 502*c* and rendered for the user 501.

During transitions from one audio source device to another (e.g., changing from mode to another), audio played back via the wearable device(s) 502*c* can be cross-faded or otherwise gradually transitioned to prevent abrupt transitions that can be unpleasant for the user. Similarly, when a wearable playback device 502*c* transitions between a first mode that amplifiers ambient sounds and a second mode that plays back audio content received from a source device, the audio played back can be cross-faded or otherwise gradually transitioned between the two modes so as to prevent a jarring audible event.

FIGS. 5C, 5D, 5E, and 5F illustrate example arrangements of a wearable playback device 502*c* with respect to one or more external devices. In FIG. 5C, a wearable playback device 502*c* are coupled to the gateway device 550, which in turn is coupled to a video display device 568. In the illustrated example, the wearable playback device 502*c* takes the form of right and left hearing aids configured to be worn by a user. As discussed previously with respect to FIGS. 5A and 5B, the wearable playback device 502*c* can wirelessly receive audio content from the gateway device 550. In some examples, the audio content can include audio accompanying video content that is simultaneously played back via the video display device 568.

In the arrangement shown in FIG. 6A, a single user equipped with the wearable playback device 502*c* can experience audio content accompanying video played back via the video display device 568. Because the audio content is played back directly via the wearable playback devices 502*c*, as opposed to amplifying externally played back audio content in the manner of a conventional hearing aid, the audio quality can be markedly improved. Additionally, the audio content may be particularly adapted for playback via the wearable playback devices 502*c*, for example having speech enhancement or other modifications that may be beneficial for users with hearing impairment.

FIG. 5D illustrates an arrangement in which the wearable playback device 502*c* is coupled to the gateway device 550, which in turn is coupled to the non-wearable playback device 102*i*. In this arrangement, audio content can be transmitted to the wearable playback device 502*c* via the gateway device 550 for synchronous playback with the non-wearable playback device 102*i*. As with the configuration of FIG. 5C, this arrangement can provide improved audio quality for the user donning the wearable playback device 502*c*. Additionally, other users in the environment can simultaneously listen to the same audio content as played back via the non-wearable playback device 102*i*, thereby providing a shared listening experience.

In the example shown in FIG. 5E, the wearable playback device 502*c* is coupled to the gateway device 550, which in turn is coupled to a soundbar 102*b* or other suitable non-wearable playback device. FIG. 5F illustrates a similar arrangement, with the addition of surround-sound non-wearable playback devices 102*j* and 102*a*. In each of these arrangements, audio can be synchronously played back via the wearable playback device 502*c* in synchrony with audio played back via the soundbar 102*b* and/or surround-sound playback devices 102*j* and 102*a*. This operation can enable a shared listening experience, particularly in the home theatre context.

In each of the examples shown in FIGS. 5C-5F, the gateway device 550 can be omitted entirely (e.g., with transmission directly from the video display device 568 or non-wearable playback devices 102*i* or 102*b* to the wearable playback devices 502*c*) or the gateway device 550 can be integrated within (e.g., enclosed within a common housing with) any one of the other devices.

As noted previously, in some instances the wearable playback device 502*c* may simultaneously play back audio content received from an audio source device and may also amplify ambient sounds detected via microphones (e.g., to provide hearing enhancement for the user 501). In such instances, the relative volumes of the audio playback can be controlled either automatically to achieve desired parameters or based on input from the user. According to some examples, a user may control a balance between enhancing ambient sounds in the environment and playing back an audio stream from an audio source device using inputs on the wearable playback device 502*c* itself and/or by providing input via a controller device.

As noted above in FIGS. 5A-5F, an example of a distributed audio playback environment 500 may include one or more non-wearable playback devices 102, one or more gateway devices 550, a wearable playback device 502 (e.g., the wearable playback device 502*c*), and a controller device 104, such as a mobile phone. In an example, the non-wearable playback devices 102 are configured to receive media content and are configured to play the media content in synchrony with one another.

As noted above, an example of the gateway device 550 is communicatively coupled with at least one of the non-wearable playback devices 102 and is configured to receive the media content from the non-wearable playback devices 102. As previously noted, the wearable playback device 502*c* may include a microphone and a transducer and is commutatively coupled to the gateway device 550. The wearable playback device 502*c* is configured to receive the media content from the gateway device 550 and to simultaneously play ambient audio received via the microphone and the media content via the transducer. In some examples, the wearable playback device 502*c* is configured to simultaneously play the ambient audio and the media content while one or more non-wearable playback devices 102 play the media content.

In an example, the wearable playback device 502*c* is configured to indicate to a user 501 of the wearable playback device 502*c* that the wearable playback device 502*c* is capable of playing the media content when the wearable playback device 502*c* is within a range of the gateway device 550 that facilitates communications with the gateway device 550. For instance, the gateway device 550 may periodically communicate a beacon signal. The wearable playback device 502*c* receives the beacon signal and communicates an acknowledgment signal to the gateway device 550 after receiving and processing the beacon signal.

The signal strength of the beacon signal may be set so that the wearable playback device 502*c* communicates the acknowledgment signal when the wearable playback device 502*c* is within a predetermined range of the gateway device 550, such as within twenty feet of the gateway device 550. In some examples, the beacon signal includes a received signal strength indicator (RSSI) that reports to the wearable playback device 502*c* the strength of the acknowledgment signal as received by the gateway device 550. In another example, the wearable playback device 502*c* communicates an RSSI associated with the beacon signal to the gateway device 550. The wearable playback device 502*c* communicates the indication to the user 501 when the RSSI level is above a threshold, such as above −20 dBm.

An example of the indication provided by the wearable playback device 502*c* to the user 501 is an audible indication. For instance, an example of the audible indication corresponds to a chime or a jingle. An example of the audible indication corresponds to a report from a voice assistant such as, for example, "You are within range of a Sonos playback zone." In cases where there are multiple playback zones (i.e., groups of playbacks playing different media content), the report can further identify the specific zone (e.g., by name as "zone 1", "zone 2" "Living Room", or "Kitchen").

Another example of the indication corresponds to haptic feedback. For instance, in an example, the wearable playback device 502*c* is configured to vibrate to indicate to the user 501 that the wearable playback device 502*c* is within range of the gateway device 550. Other examples of haptic feedback are possible as well.

In another example, a controller device 104 associated with the wearable playback device 502*c* provides an indication to the user 501 of the wearable playback device 502*c* via, for example, a notification, chime, haptic feedback, etc. The controller device 104 can correspond to any of the controller devices described above. In an example, settings for controlling the behavior of the indication are specified via the controller device 104.

In an example, when the wearable playback device 502*c* is within a range of the gateway device 550 that facilitates communications with the gateway device 550, an indication can be received from a user 501 via a user interface of the wearable playback device 502*c* to play the media content. In this case, the wearable playback device 502*c* becomes part of a zone (i.e., playback zone in which all members of the zone play the same audio content). For instance, the wearable playback device 502*c* may include a switch and tapping the switch by the user 501 causes the wearable playback device 502*c* to play the media content.

In another example, the wearable playback device 502*c* facilitates responding to a voice assistant. For example, in response to hearing the audible indication "You are within range of a Sonos zone," the user 501 of the wearable playback device 502*c* can say the command "Connect to Sonos zone," and the wearable playback device 502c can responsively become part of the zone and begin to play the media content.

In a further example, the indication by the user 501 is specified via the controller device 104. For example, a notification may "popup" on the controller device 104 asking the user 501 whether to connect to the zone. Responding in the affirmative causes the wearable playback device 502c to become part of the zone and begin to play the media content.

As noted above, the non-wearable playback device 102 may include a user interface that facilitates simultaneous adjustments of a volume level associated with one or more non-wearable playback devices 102. For example, adjustment of the volume level causes other non-wearable playback devices 102 of a zone to change. In cases where the non-wearable playback devices 102 and the wearable playback device 502c are simultaneously playing the same media content (i.e., are part of the same zone), it can be undesirable to have the volume of the wearable playback device 502c change along with the non-wearable playback devices 102. Therefore, in some examples, adjusting the volume via the user interface of the non-wearable playback device 102 does not adjust a volume associated with the wearable playback device 502c but does adjust the volume of other grouped non-wearable playback devices 102. In this example, adjustment of the volume of the wearable playback device 502c would occur using volume buttons on the wearable playback device 502c or a controller associated only with the wearable playback device 502c.

In other examples, the volume is specified via a controller device 104 associated with the non-wearable playback devices 102 and the wearable playback device 502c. In examples where the controller device 104 is associated with the user 501 of the wearable playback device 104, adjustment of the volume adjusts the volume levels of the non-wearable playback device(s) 102 and the wearable playback device 502c. For example, when the controller 104 corresponds to a mobile device belonging to the user 501 and the controller device 104 is registered as being a controller for the wearable playback device 502c, adjustment of the volume via the controller device 104 causes the volume of the non-wearable playback device(s) 102 and the wearable playback device 502c to change. On the other hand, if the controller 104 is operating on a desktop computer that is not particularly associated with the wearable playback device 502c (e.g., a laptop computer within the home), then adjustment of the volume may not adjust the volume of the wearable playback device 502c.

In some examples, before the controller device 104 is allowed to change the volume of the wearable playback device 502c, the wearable playback device 502c is registered with the controller device 104. In some examples, a setting from the controller device 104 is provided to specifically allow the controller device 104 to adjust the volume of the wearable playback device 502c. In some examples, a different setting is provided that allows adjustments made via a non-wearable playback device 102 to be propagated to the wearable playback device 502c. For example, enabling a setting such as "Allow Remote Volume Control" facilitates changing the volume of the wearable playback device 502c via the non-wearable playback device(s) 102 and possibly controller devices 104 that are not specifically registered to the user 501 of the wearable playback device 502c.

As previously noted, some non-wearable playback devices 102 include a microphone and a transducer. In some examples, a voice assistant request is received via the microphone of the non-wearable playback device 502c. For example, a user 501 may say the command, "What is the weather going to be like today?" A voice assistant response associated with the voice assistant request (e.g., "Sunny with a high of 90 degrees.") is communicated to the non-wearable playback device 502c and played via the transducer of the non-wearable playback devices 102.

In some examples, the non-wearable playback device 102 may be in the same group as a wearable playback device 502c and may be playing the media content when the response is returned. In these cases, where the voice assistant request is received via the microphone of the non-wearable playback devices 102, it may be undesirable to have the voice assistant response played back via the wearable playback device 502c. This is especially true when the user 501 of the wearable playback device 502c did not make the request. In this case, the voice assistant response may not be played via the wearable playback device 502c. However, the wearable playback device 502c may continue to simultaneously play back the media content with the non-wearable playback devices 102 while the voice assistant response is played via the non-wearable playback devices 102.

In another example, when the voice assistant request is received via a microphone of the wearable playback device 502c, the voice assistant response is played back via the wearable playback device 502c. In some examples, the voice assistant response is played back via both non-wearable playback devices 102 and the wearable playback device 502c of the zone. The voice assistant response may be played back via the devices while media content is played back via the devices. For example, the volume of the media content may be reduced to an extent when the voice assistant response is played back to facilitate hearing the voice assistant response without stopping media playback, which is also known as ducking.

Figure 6:
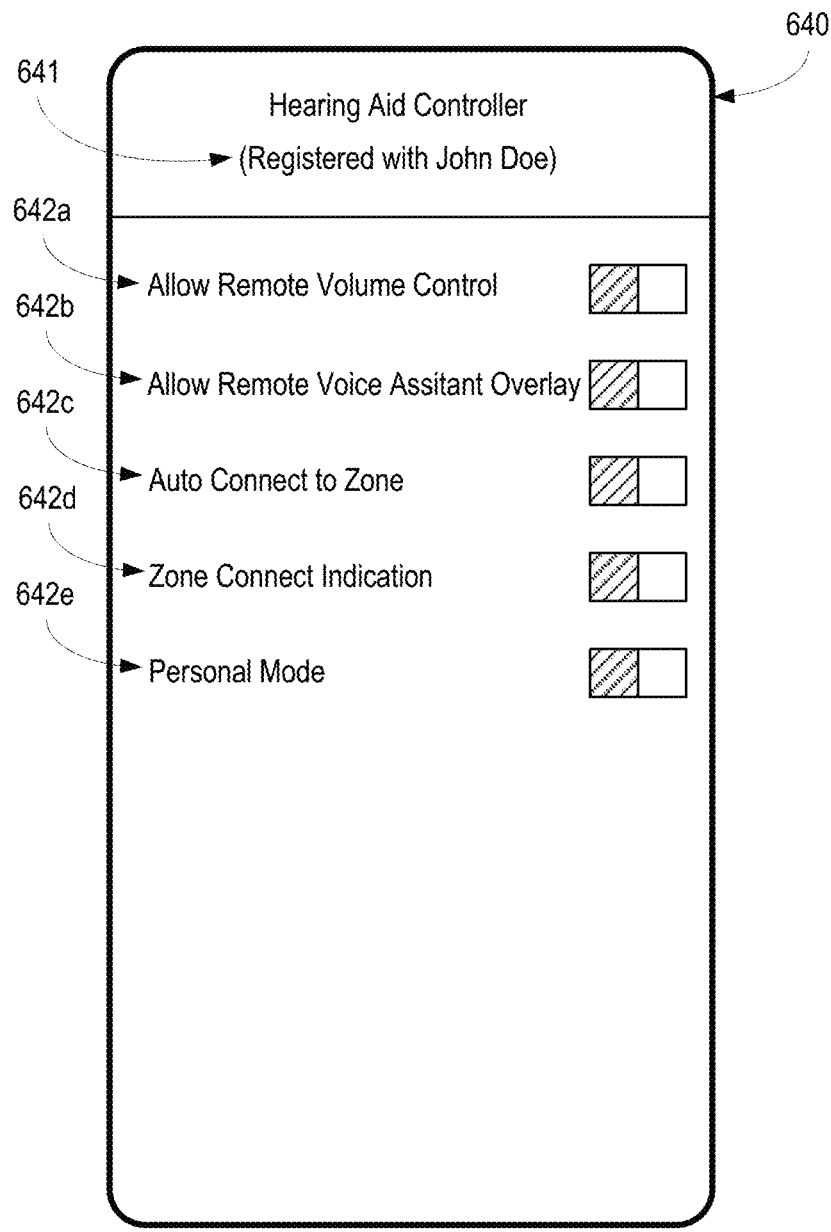
FIG. 6 illustrates a user interface that may be presented on a controller device of the environment that facilitates specifying settings that control one or more behaviors of the wearable playback device in accordance with aspects of the disclosure.

FIG. 6 illustrates an example of a user interface 640 that may be presented on a controller device 104 that facilitates specifying settings that control one or more behaviors of the wearable playback device 502c and/or the gateway device 550, described above.

A first region of the user interface 640 depicts a registered user control 641. As noted above, it may be desirable to limit the behavior of certain controls that can affect the behavior of the wearable playback device 502c to registered users, such as the user 501 associated with the wearable playback device 502c. The registered user control 641 is configured to facilitate registering a wearable playback device 502c, such as a hearing aid with the controller device 104. For example, clicking the registered user control 641 may initiate a pairing procedure for pairing the wearable playback device 502c with the controller device 104. After pairing is complete, the name of the user 501 associated with the wearable playback device 502c or other wearable playback device identifying information may be depicted within the registered user control 641.

A second region of the user interface 640 depicts a group of controls 642 that facilitate enabling/disabling various features. In an example, a first control 642a facilitates enabling/disabling remote volume control of the wearable playback device 502c. For example, as previously noted, some examples of non-wearable playback devices 102 include a user interface that facilitates simultaneous adjustments of a volume level associated with one or more non-wearable playback device 102. In cases where the non-wearable playback devices 102 and the wearable playback device 502c are simultaneously playing the same media content (i.e., are part of the same zone), it can be undesirable to have the volume of the wearable playback device 502c change along with the non-wearable playback devices 502c. When the first control 642a is disabled, the volume of the wearable playback device 502c does not change when the volume levels of non-wearable playback devices 102 of the same zone are changed via the user interface of one of the non-wearable playback device 102. Conversely, when the first control 642a is enabled, the volume of the wearable playback device 502c changes with the volume level of non-wearable playback devices 102 of the same zone.

A second control 642b facilitates enabling/disabling remote voice assistance overlay. As noted above, in some examples, a non-wearable playback device 102 in the same group as a wearable playback device 502c may receive a response to a voice assistant request. In these cases, where the voice assistant request is received via the microphone of the non-wearable playback device 102, it may be undesirable to have the voice assistant response played back via the wearable playback device 502c. When the second control 642b is disabled, the voice assistant response is played back via the non-wearable playback device 102 but is not played back via the wearable playback device 502c. Conversely, when the second control 652b is enabled, the voice assistant response is played back via both the wearable playback device 502c and the non-wearable playback device 102.

A third control 652c facilitates enabling/disabling auto grouping of the wearable playback device 502c to a zone. For example, as noted above, the gateway device 550 may periodically communicate a beacon signal to the wearable playback device 502c, and the wearable playback device 502c may communicate an acknowledgment signal to the gateway device 550 to indicate that it is within a predetermined range of the gateway device 550. In other words, the acknowledgment signal is communicated to indicate that the wearable playback device 502c is capable of receiving, for example, media content signals from the gateway device 550. When the third control 642c is enabled, the wearable playback device 502c is configured to automatically join a zone associated with the gateway device 550 and to begin to stream media content from the gateway device 550 (i.e., media content being communicated within a zone).

As discussed above, the wearable playback device 502c may have a first mode where the wearable playback device 502c functions as a hearing aid and a second mode as an audio playback device. The wearable playback device 502c may automatically connect to the gateway device 550 when the wearable playback device is operating in the second mode or in response to switching to the second mode from another mode. If there is more than one gateway device 550, the wearable playback device may, for example, automatically connect to the gateway device 550 that has an active playback session, the gateway device 550 that has the most playback session, or the nearest gateway device 550.

A fourth control 642d facilitates enabling/disabling providing of a zone connect indication to the user. As noted above, in some examples, when the wearable playback device 502c is within a particular range of the gateway device 550, an indication is communicated to the user 501. For instance, an audible indication such as a chime, jingle, or voice assistant prompt can be communicated to the user 501. When the fourth control 642d is enabled, the indication is communicated to the user 501 when the wearable playback device 502c is within range of the gateway device 550.

A fifth control 642e (e.g., personal mode) facilitates enabling/disabling private listening of the media content. For example, media content may initially be played back by the wearable playback device 502c and one or more non-wearable playback devices 102 that are part of the same group or zone as the wearable playback device 502c. In this example, when the fifth control 642e is enabled, playback by the non-wearable playback devices 102 of the group is muted while playback via the wearable playback device 502c continues.

The controls above are merely exemplary. It should be understood that additional controls can be provided to adjust the behavior(s) of different aspects of the environment, and/or the individual devices. Such controls may be selectable and/or otherwise operable to change settings within the environment. In some cases, one or more messages are sent from the controller device 104 to the wearable playback device 502c to cause the wearable playback devices 502c to change a setting when the setting is changed via the interface 640.

Within examples, another control can specify where a zone connect indication should be sent (e.g., via the wearable playback device 502c or via a pop-up window on the controller device 104). In some cases, the control may allow multiple destinations for an indication, so that the user receives the indication in more than one way. Other examples are possible as well.

For instance, another control can facilitate specifying a minimum amount of time the wearable playback device 502c should be within range of a gateway device 550 that is in communication with a non-wearable playback device 102 before auto-connecting to the corresponding zone or providing an indication to the user 501. Yet another control can facilitate specifying a minimum amount of time the wearable playback device 502c should remain connected to a zone before switching to another zone. These two controls provide a degree of hysteresis. For example, these controls prevent the media content communicated to the wearable playback device 502c from unnecessarily changing as the user moves between rooms of a home.

Another control can facilitate momentarily stopping playback of media content via the wearable playback device 502c. For example, where the wearable playback device 502c corresponds to a hearing aid, the user 501 of the hearing aid can enable the control so that media content is no longer heard via the hearing aid. In an example, the media content continues to be played back via grouped non-wearable playback devices 102. Disabling this control causes the hearing aid to resume playback of the media content.

Figure 7:
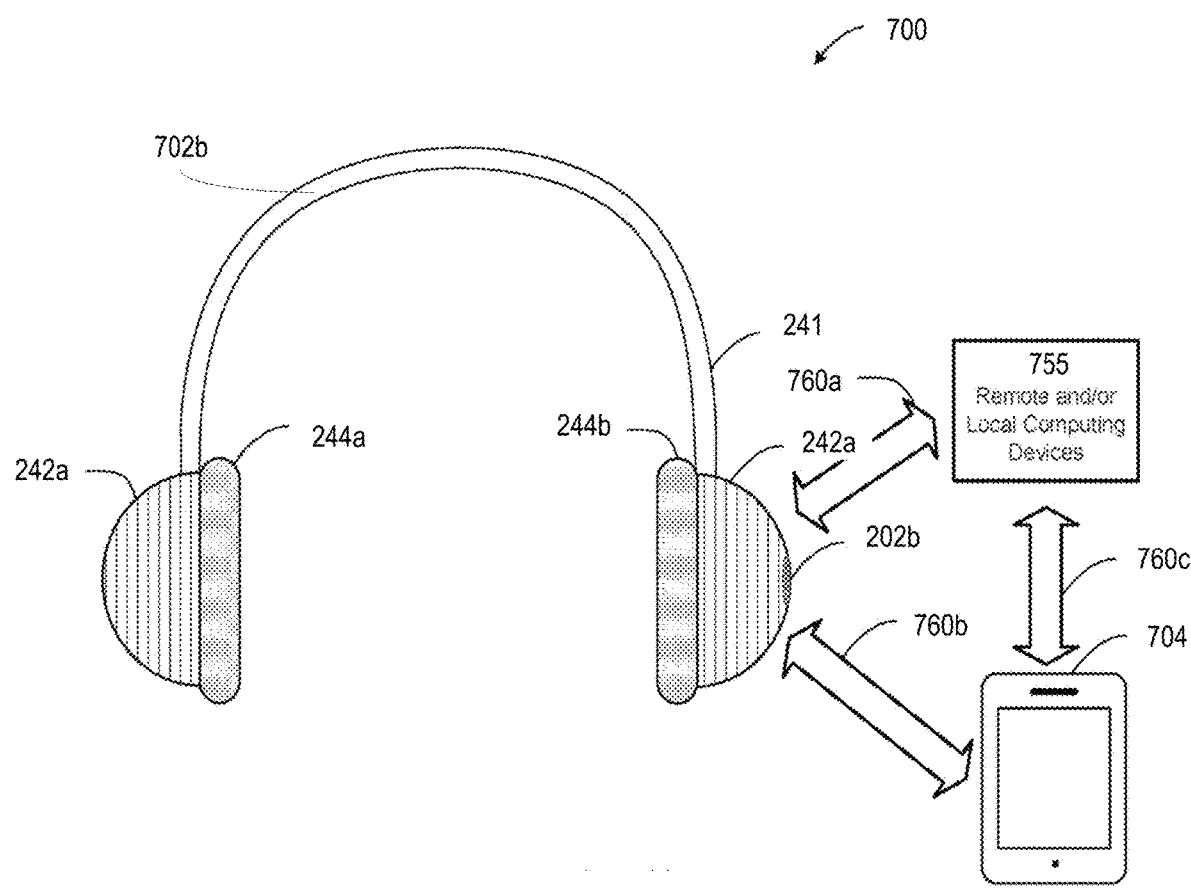
FIG. 7 is a schematic illustration of an environment including a wearable playback device in communication with a plurality of external devices.

FIG. 7 shows another example environment 700 including a wearable playback device 702b, which may be the same or similar as the playback device 202b. While the wearable playback device 702b is shown as headphones by way of examples, the example environment 700 may also include other types of wearable playback devices including the other example wearable playback devices described herein, as well as other types of wearable playback devices.

In the environment 700, the wearable playback device 702b may communicate over a first communication link 760a (e.g., a BLUETOOTH link) with one of the control devices 704 and/or over a second communication link 760b (e.g., a Wi-Fi or cellular link) with one or more other computing devices 755 (e.g., a network router and/or a remote server). As another possibility, the wearable playback device 502b may communicate over multiple communication links, such as the first communication link 760a with the control device 104 and a third communication link 760c (e.g., a Wi-Fi or cellular link) between the control device 704 and the one or more other computing devices 755. Thus, the control device 704 may function as an intermediary between the playback device 702*b* and the one or more other computing devices 755, in some embodiments.

Figure 8:
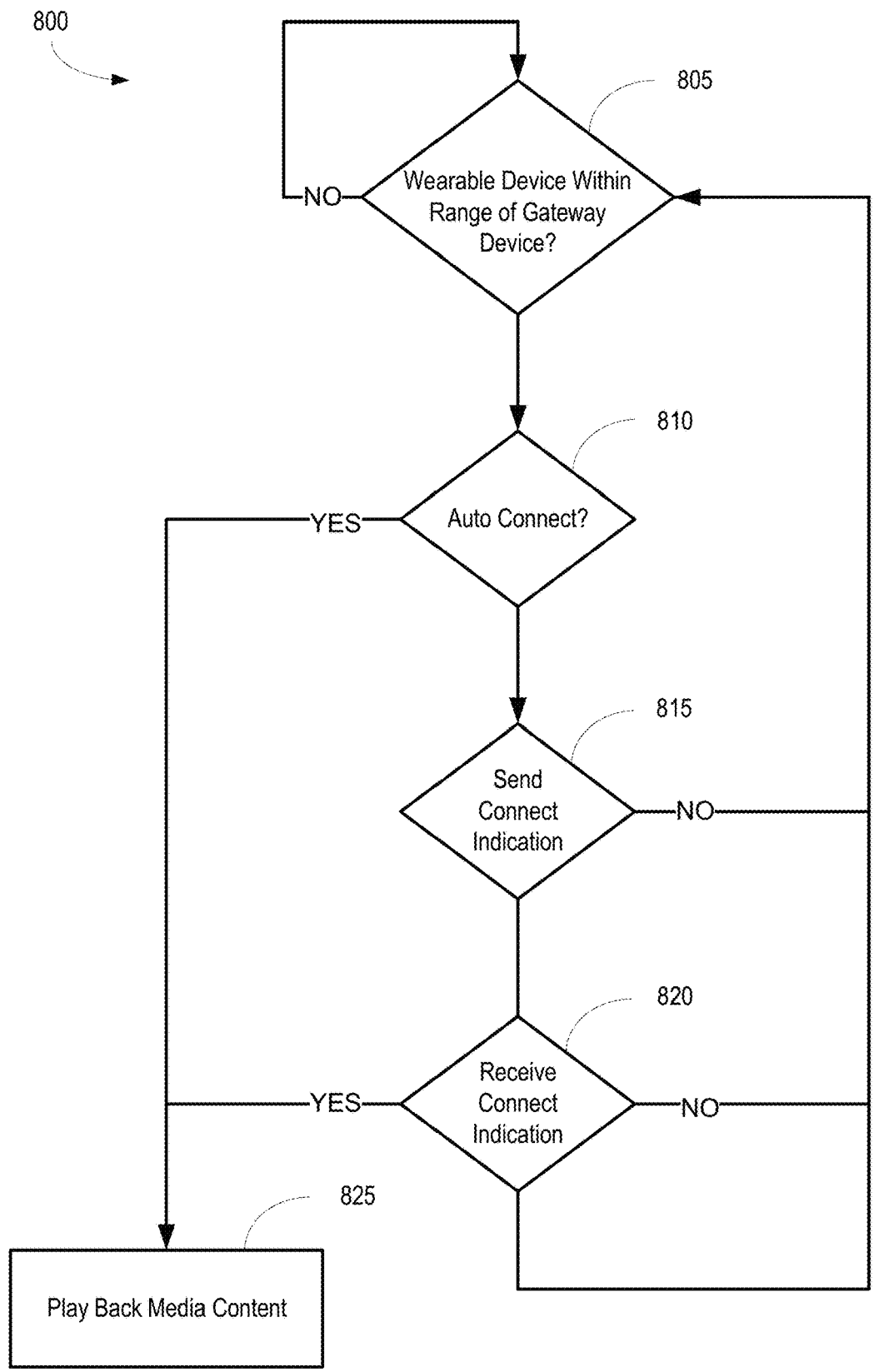
FIG. 8 illustrates operations performed by one or more entities of the environment in accordance with aspects of the disclosure.

FIG. 8 illustrates a method 800 including operations performed by one or more entities of the environment 500 of FIG. 5. In this regard, one or more of the operations can be implemented via instruction code, stored in a memory of one or more of the entities, configured to cause one or more processors of entities to perform the operations illustrated in the figures and discussed herein. By way of example, the operations are discussed as being performed by a wearable device 502*c*, which is representative of wearable playback devices disclosed herein.

At block 805, a determination is made as to whether the wearable device 502*c* is within range of the gateway device 550. For example, the gateway device 550 may periodically communicate a beacon signal to the wearable playback device 502*c*.

In an example, the wearable playback device 502*c* is determined to be within range of the gateway device 550 when the wearable playback device 502*c* is able to process the beacon signal and communicate an acknowledgment response to the gateway device 550. In some examples, the beacon signal includes a received signal strength indicator (RSSI) that reports to the wearable playback device 502*c* the strength of the acknowledgment signal as received by the gateway device 550. In another example, the wearable playback device 502*c* communicates an RSSI associated with the beacon signal to the gateway device 550. In an example, the wearable playback device 502*c* is determined to be within range of the gateway device 550 when the RSSI level is above a threshold, such as above −20 dBm. In some examples, the determination is made by the gateway device 550. In another example, the determination is made by wearable playback device 502*c*. In yet other examples, the determination is made by other entities such as a controller device 104 associated with the wearable playback device 502*c*.

If at block 805, the wearable playback device 502*c* is determined to be within range of the gateway device 550, and if at block 810, the auto-connect option is enabled, then at block 825, the wearable playback device 502*c* begins to play back media content. For example, the third control 642*c* of the user interface 640 in FIG. 6 can be set to enable auto-connecting to a zone.

If at block 810, the auto-connect option is disabled, and if at block 815, a send indication option is enabled, then an indication (e.g., audio, haptic, etc.) is communicated to the user 501 of the wearable playback device 502*c*. For example, the fourth control 642*d* of the user interface 640 in FIG. 6 can be set so that an indication will be communicated to the user 501. In an example, the indication is communicated via the wearable playback device 502*c*. In another example, the indication is communicated via a controller device 104 associated with the wearable playback device 502*c*.

If at block 815, the indication is communicated, and if at block 820, a connect indication is received from the user 501, then the wearable device 502*c* proceeds to play back the media content at block 825. In an example, the user 501 sends the connect indication via a switch on the wearable playback device 502*c* or by saying a voice command that causes the connect indication to be sent. In another example, the indication is communicated via a controller device 104 associated with the wearable playback device 502*c*.

Figure 9:
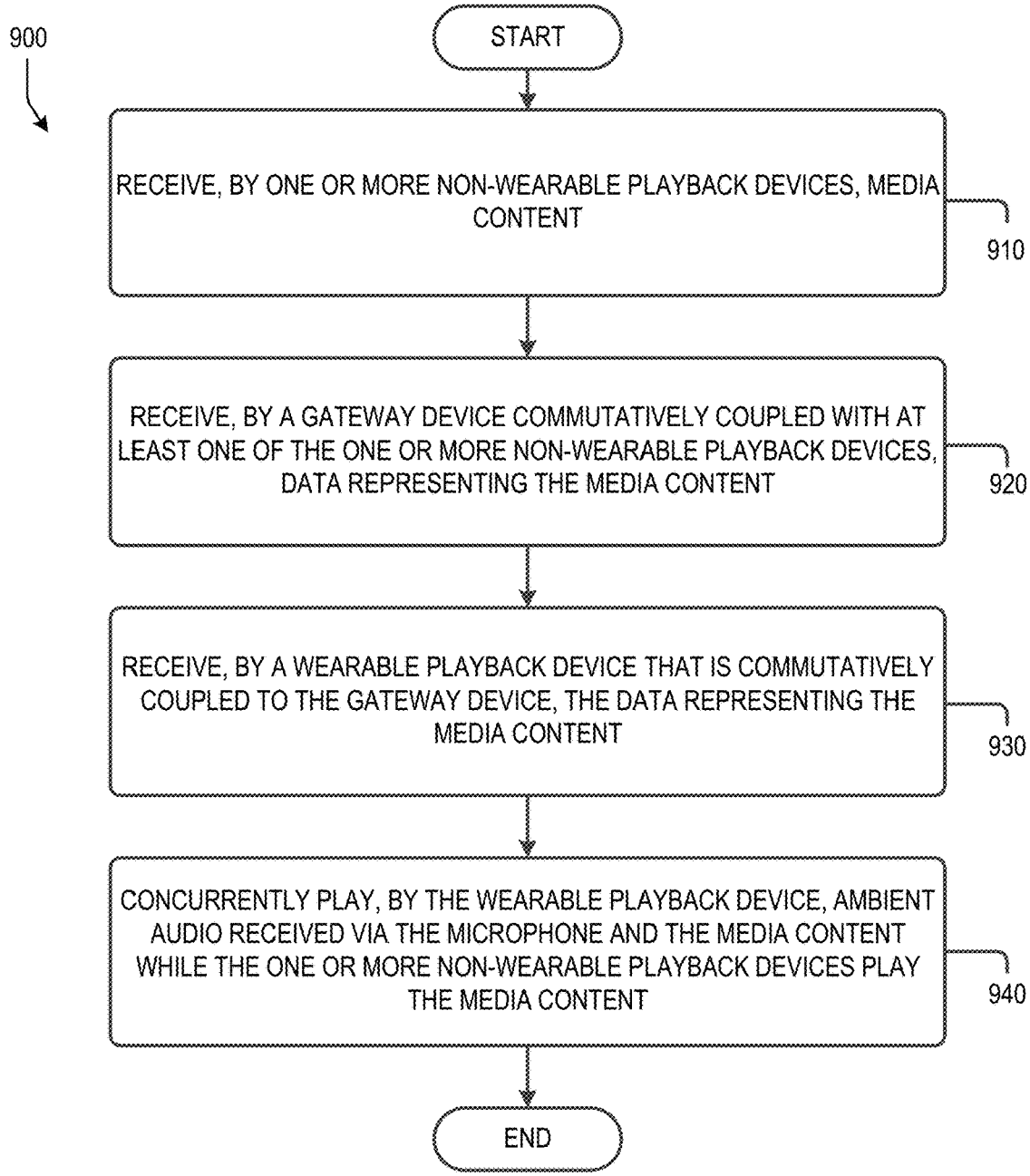
FIG. 9 illustrates further operations performed by one or more entities of the environment in accordance with aspects of the disclosure.

FIG. 9 illustrates a method 900 illustrating examples of further operations performed by one or more entities of the environment 500 of FIG. 5.

At block 910, the method 900 involves receiving, by one or more non-wearable playback devices 102, media content. The one or more non-wearable playback devices 102 are configured to play the media content in synchrony with one another.

At block 920, the method 900 involves receiving, by a gateway device 550 commutatively coupled with at least one of the non-wearable playback devices 102, data representing the media content.

At block 930, the method 900 involves receiving, by a wearable playback device 502*c* that is commutatively coupled to the gateway device 550, the media content. The wearable playback device 502*c* may include a microphone and a transducer.

At block 940, the method 900 involves the wearable playback device 502*c* concurrently playing ambient audio received via the microphone and the media content via the transducer while the one or more non-wearable playback devices 102 play the media content.

Some examples involve indicating, via the wearable playback device 502*c* and to a user 501 of the wearable playback device 502*c*, that the wearable playback device 502*c* is capable of playing the media content, responsive to determining that the wearable playback device 502*c* is within a range of the gateway device 550 that facilitates communications with the gateway device 550.

In some examples where the wearable playback device 502*c* is within the range of the gateway device 550 that facilitates communications with the gateway device 550, the examples further involve receiving an indication via a user interface of the wearable playback device 502*c* to play the media content.

In some examples where the wearable playback device 502*c* is within the range of the gateway device 550 that facilitates communications with the gateway device 550, the examples further involve receiving an indication via a user interface of a controller device 104 to play the media content.

In some examples, a particular non-wearable playback device 102 of the one or more non-wearable playback devices 102 comprises a user interface that facilitates simultaneous adjustments of a volume level associated with the one or more non-wearable playback devices 102. In these examples, when the one or more non-wearable playback devices 102 and the wearable playback device 502*c* are simultaneously playing the media content, the example further involves adjusting the volume of the non-wearable playback device 102 without adjusting a volume associated with the wearable playback device in response to receiving an indication via the user interface of the non-wearable playback device to adjust the volume of the non-wearable playback device.

In some examples, a controller device 104 comprises a user interface 540 that facilitates simultaneous adjustments of a volume level associated with the one or more non-wearable playback devices 102. In these examples, when the one or more non-wearable playback devices 102 and the wearable playback device 502*c* are simultaneously playing the media content, the example further involves adjusting the volume of the one or more non-wearable playback devices 102 and a volume associated with the wearable playback device 502*c* in response to receiving an indication via the user interface 540 of the controller device 104 to adjust the volume of the one or more non-wearable playback devices 102.

In some examples, a particular non-wearable playback device 102 of the one or more non-wearable playback devices 102 comprises a microphone and a transducer. These examples further involve receiving, via the microphone of the non-wearable playback device 102, a voice assistant request; receiving a voice assistant response associated with the voice assistant request; simultaneously playing back the media content and the voice assistant response via the transducer of the non-wearable playback device 102; and playing back, by the wearable playback device 102, the media content without the voice assistant response.

Some examples involve receiving, via the microphone of the wearable playback device 502c, a voice assistant request, receiving a voice assistant response associated with the voice assistant request, and simultaneously playing back the media content and the voice assistant response via the transducer of the wearable playback device 502c.

Figure 10:
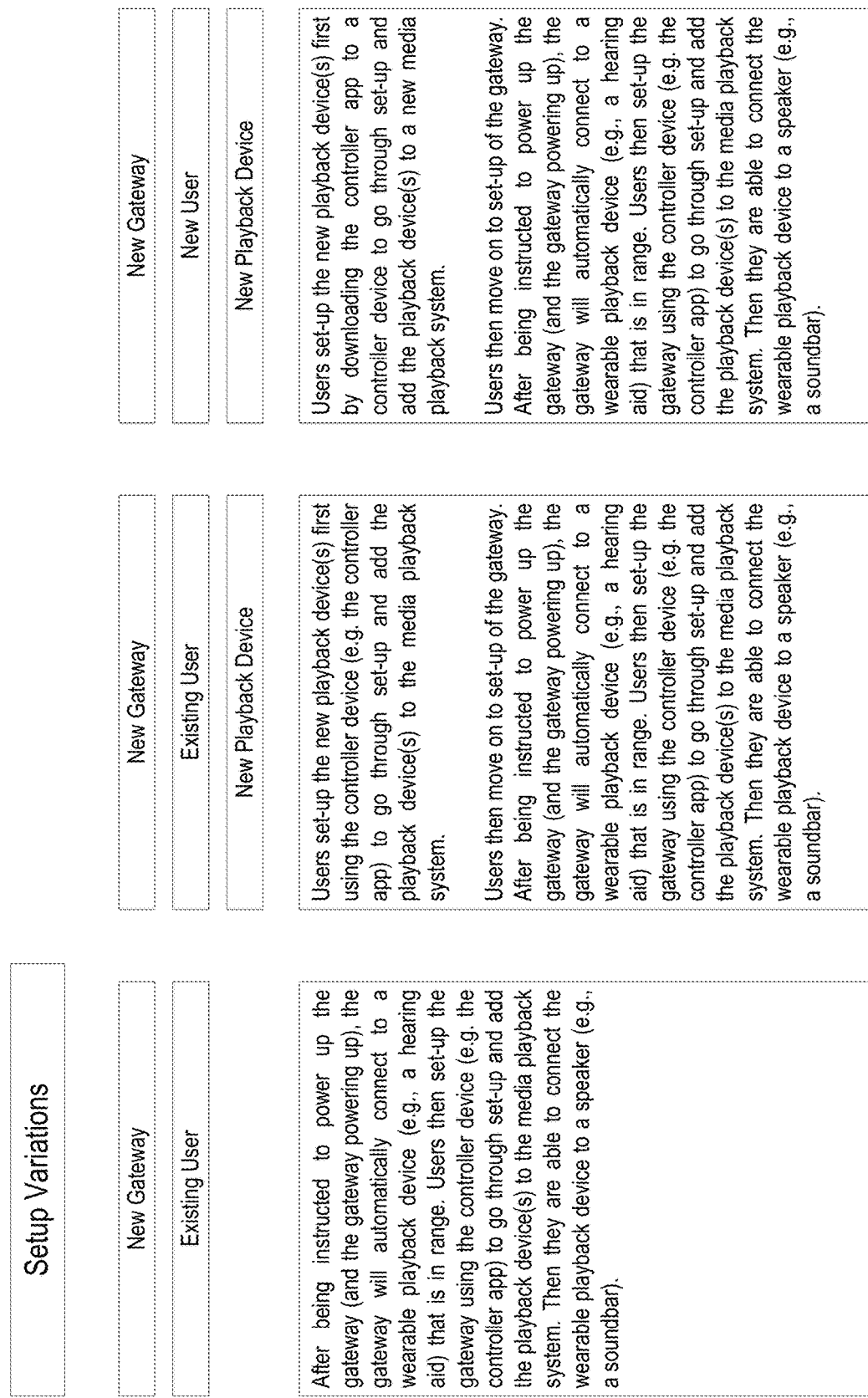
FIG. 10 is a diagram illustrating setup of one or more devices in accordance with aspects of the disclosure.

FIG. 10 is a diagram illustrating example variations on setup of a gateway device. The variations include setup of a new gateway (e.g., the gateway device 550 in FIGS. 5A and 5B) with an existing user, setup of a new gateway with an existing user and a new playback device (e.g., a new playback device 102), and setup of a new gateway with a new user and a new playback device.

Figure 11:
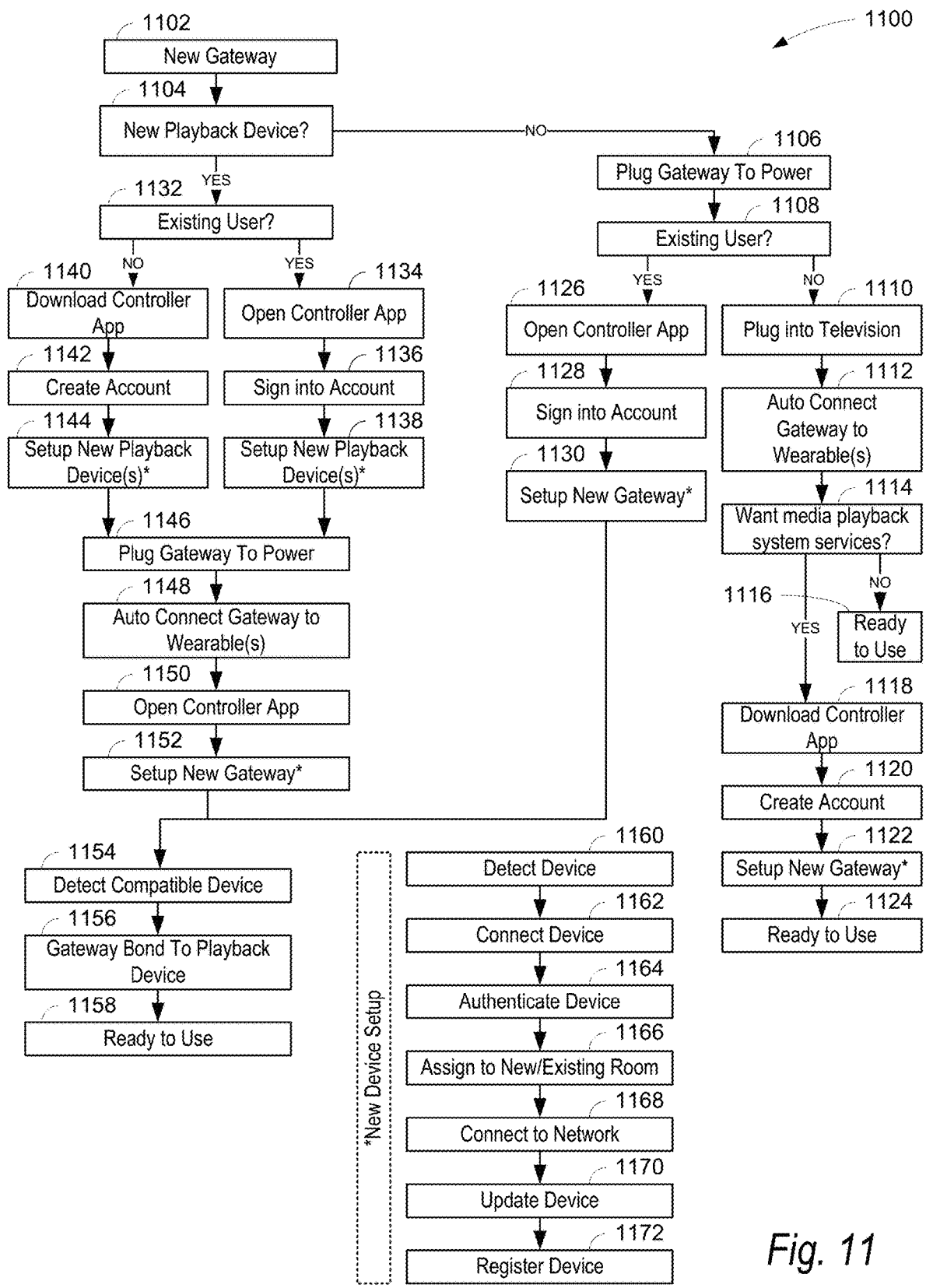
FIG. 11 illustrates operations performed by one or more entities of the environment in accordance with aspects of the disclosure.

FIG. 11 is a flow diagram illustrating an example method 1100 to set-up devices under the example variations in FIG. 10. By way of example, the operations are described as being performed by a system, such as the media playback system 100 or the example operating environment 500A or 500B. In various implementations, the operations may be performed by any suitable device or combination of devices, such as the example controller devices, playback devices, gateway devices, and other devices described herein, as well as other suitable devices or combination of devices.

At block 1102, setup of a new gateway (e.g., a newly purchased or factory reset gateway) is initiated. At block 1104, the system determines whether a new playback device is being setup concurrently with the new gateway (e.g., as may occur when a user purchases both devices around the same time). This determination may be made via a prompt asking the user which devices are being setup, or by detecting a single device or multiple devices (e.g., via Bluetooth or Bluetooth Low Energy), among other examples.

If not, the method 1100 proceeds to block 1106, where the user is instructed to plug the gateway in to power (e.g., wall power). Assuming that the user does power the gateway, the method 1100 proceeds to block 1108. At block 1108, the system determines whether the new gateway is being registered to a new or existing user.

If not being registered to an existing user, at block 1110 the user is instructed to plug the gateway into the television via a wired connection (e.g., HDMI, optical, audio input port). This connection allows the gateway to provide audio from the television to the wearable playback device, as discussed in connection with FIGS. 5A and 5B, for instance. At block 1112, the system automatically connects the gateway to wearable playback device(s) in communicative range of the gateway.

At block 1114, the system determines whether the user wants to utilize media playback system services (i.e., cloud services). If not, at block 1116, the gateway is ready to use with the connected wearable playback device(s). If so, at block 1118, the user is prompted to download the controller app, so as to add controller device functionality to their mobile device or other compatible computing device. At block 1120, the user is prompted to create an account using the controller app. At block 1122, the new gateway undergoes a new device setup process to link the gateway with a media playback system, such as the media playback system 100. Further details regarding the new device setup process are discussed below with respect to blocks 1160 to 1172. Following the new device setup process, at block 1124, the gateway is ready to use with the connected wearable playback device(s).

At block 1126, when the gateway is being used with an existing user, the controller app is opened. At block 1128, the user uses the controller app to sign into their existing account. Then, at block 1130, the new gateway undergoes a new device setup process to link the gateway with a media playback system, such as the media playback system 100. Further details regarding the new device setup process are discussed below with respect to blocks 1160 to 1172.

Returning to block 1104, when new playback device(s) are being setup with the gateway, the method 1100 proceeds to block 1132. At block 1132, the system determines whether the new gateway is being registered to a new or existing user. If the user is an existing user, at block 1134, the controller app is opened. At block 1136, the user uses the controller app to sign into their existing account. Then, at block 1138, the new playback device(s) undergo a new device setup process to link the new playback device(s) with a media playback system, such as the media playback system 100. Further details regarding the new device setup process are discussed below with respect to blocks 1160 to 1172. Conversely, if the user is a new user, at block 1140, the user is prompted to download the controller app. At 1142, the user is prompted to create an account using the controller app. At 1140, the new playback device(s) undergo a new device setup process to link the new playback device(s) with a media playback system, such as the media playback system 100.

Following blocks 1138 or 1144, the method 1100 proceeds to block 1146 where the user is instructed to plug the gateway in to power (e.g., wall power). Assuming that the user does power the gateway, the method 1100 proceeds to block 1148. At block 1148, the system automatically connects the gateway to wearable playback device(s) in communicative range of the gateway. At 1150, the controller app is opened. Then, at block 1152, the new gateway undergoes a new device setup process to link the gateway with a media playback system, such as the media playback system 100. Further details regarding the new device setup process are discussed below with respect to blocks 1160 to 1172.

Following blocks 1130 or 1152, the method 1100 proceeds to block 1154. At 1154, the system detects playback devices compatible with the gateway. Then, at block 1156, one or more particular playback devices are bonded to the gateway. Then, at block 1158, the gateway is ready to use.

As noted above, blocks 1160 to 1172 involve a new device setup process. The new device setup process may be used for new (or factory reset) gateway and playback devices. At block 1160, the method 1100 involves detecting devices (e.g., via Bluetooth or Bluetooth Low Energy, or other suitable communication detection medium). At block 1162, the method 1100 involves connecting to a particular new device 1162 of the detected device(s). At block 1164, the method 110 involves authenticating a device.

At block 1166, the method 1100 involves assigning the new device to a new or existing room (e.g., any of the rooms in the media playback system 100 for instance). At block 1168, the method 1100 involves connecting the device to a network (e.g., the LAN 111 of FIG. 1B). At block 1170, the method 1100 involves updating the new device (e.g., with software and/or firmware updates from the Internet). At block 1172, the method 1172 involves registering the device with the user account.

In some cases, setup may involve calibration of the wearable playback devices 502c and/or the gateway device 550. Since the audio data played out loud may reach a user's ear before or after the wearable playback device renders the same audio data in the user's ear, there may be a playback delay between with the audio data received via the output communication stream and the amplified ambient audio. During setup of the gateway device 550, a controller device 104 (e.g., computing device, smartphone, tablet, computer, etc.) can be used to calibrate or set estimated playback delays during the gateway device setup process.

In some instances, the playback delay can be calibrated manually via an application executing on the controller device 104. In a first example, a user may be instructed to sit in a particular location such as a regular listening location on the couch in front of a TV. A calibration tone may be played via a non-wearable playback device 102 (e.g., TV speakers, soundbar, etc.) connected to a media player (e.g., television, set-top box, streaming player) and rendered by the wearable playback device 502c. Playback of the calibration tone can be initiated by the controller device 104 sending a command to the gateway device 550 to start the calibration process. The delay between play back of the tone at the hearing instrument user and ambiently via the playback device may be measured.

In one example, the user may tap a button on the screen of the controller device when the user hears the tone being rendered by the hearing instrument and a microphone of the controller device can be used to determine when the tone from the playback device reaches the user ambiently. The measured delay can be used to inform synchronization of playback of ambient audio with rendered audio. In another example, the user may tap the button when the user hears the tone being rendered by the hearing instrument and tap the button a second time when the tone is received and amplified by the hearing instrument.

In yet another example, the user can adjust playback delay on a slider in the application until the tones played by the playback device are synchronized in the user's ear. For example, assuming without adjustment that the rendered audio reaches the user's ear before the ambient audio, increasing the slider can delay when the tone is rendered in the user's ear. The delay setting of the slider once the tones are synchronized in a user's ear (e.g., 15 ms, 30 ms, etc.) can indicate what the playback delay is between rendered and ambient audio.

In some instances, the playback delay can be calibrated automatically. The hearing instrument may have a microphone and have the capability to transmit communications to a computing device via, for example, a Bluetooth or Wi-Fi connection. The first tone played back by the playback device may be different from the second tone transmitted for rendering by the wearable playback device such that the wearable playback device can differentiate the first tone and second tone. The wearable playback device can indicate to the controller device when it has received the first tone and indicate to the controller device when it has rendered the second tone. Using the timestamps of when the first tone is received and when the second tone is rendered, the controller device can determine a time delay between when the first tone and the second tone are received at a user's ear.

While the following examples are provided for the purpose of illustration, any combination of manual or automatic calibration may be implemented.

As noted above, with example wearable playback devices that operate as hearing aids, two audio pathways to a user's ear may exist concurrently, which include: audio received over a network interface (e.g., Bluetooth, Wi-Fi) from the gateway device 550 and rendered by the wearable playback device 502c, and audio received via microphones on the wearable playback device 502c and amplified in the user's ear. In some instances, it may be desirable to determine a default or baseline volume level for rendered audio and ambient audio using a calibration process.

An application executing on a computing device or the controller device 104 can be used to assist the user with the calibration process. In one example, a user of the wearable playback device 502c or a non-user of a wearable playback device 502c can adjust the volume of the non-wearable playback device 102 using a remote to a comfortable listening level. The user of the wearable playback device can adjust the rendered audio to a comfortable volume level independent of the non-wearable playback device volume level.

The controller device 104 may indicate to the gateway device 550 to maintain this relative volume difference (e.g., x volume levels, proportional volume levels) between the non-wearable playback device audio and wearable playback device when is adjusted for the non-wearable playback device. In some instances, the wearable playback device 502c can have volume controls built-in, and volume adjustment of the wearable playback device 502c can be done independent of the non-wearable playback device volume. In some instances, adjustment of the non-wearable playback device volume occurs without impacting the volume of the wearable playback device 502c.

In some instances, multiple volume profiles may be calibrated and stored. For example, a first volume profile may be a TV listening profile, and the relative volume between TV speakers or a soundbar may be established during a calibration process. The relative volume may be stored in a selectable TV listening profile. A second volume profile may be a music listening profile which may stored a relative volume difference between music played by a non-wearable playback device and rendered audio at the wearable playback device. Because dynamic volume range and volume characteristics may be different for different types of music (e.g., classical music vs. rock music) different listening profiles may be stored for different types of music. The gateway device 550 may switch between different listening profiles based on genre metadata received for the music being played back, or based on other suitable indications. The volume profiles may be stored in the controller device 104, gateway device 550, and/or in the cloud.

Additional examples include different listening profiles for different distances from the television (or playback device) and/or different sizes of the listening room. Switching between the listening profiles may be done automatically (e.g., based on location) or manually by the user (e.g., via a controller device). Calibration may occur at a hearing professional's office or at a home of the user.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

It should be appreciated that references to transmitting information to particular components, devices, and/or systems herein should be understood to include transmitting information (e.g., messages, requests, responses) indirectly or directly to the particular components, devices, and/or systems. Thus, the information being transmitted to the particular components, devices, and/or systems may pass through any number of intermediary components, devices, and/or systems prior to reaching its destination. For example, a control device may transmit information to a playback device by first transmitting the information to a computing system that, in turn, transmits the information to the playback device. Further, modifications may be made to the information by the intermediary components, devices, and/or systems. For example, intermediary components, devices, and/or systems may modify a portion of the information, reformat the information, and/or incorporate additional information.

Similarly, references to receiving information from particular components, devices, and/or systems herein should be understood to include receiving information (e.g., messages, requests, responses) indirectly or directly from the particular components, devices, and/or systems. Thus, the information being received from the particular components, devices, and/or systems may pass through any number of intermediary components, devices, and/or systems prior to being received. For example, a control device may receive information from a playback device indirectly by receiving information from a cloud server that originated from the playback device. Further, modifications may be made to the information by the intermediary components, devices, and/or systems. For example, intermediary components, devices, and/or systems may modify a portion of the information, reformat the information, and/or incorporate additional information.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Example 1: A method comprising: in a first mode: receiving audio input via one or more microphones of the audio playback device; and generating audio output via one or more electroacoustic transducers of the audio playback device based at least in part on the audio input; and in a second mode: receiving an audio stream via a wireless transceiver of the audio playback device; and playing back the audio stream via the one or more electroacoustic transducers.

Example 2: The method of Example 1, wherein the playback device is wearable.

Example 3: The method of Example 1 or 2, wherein the playback device comprises a hearing aid.

Example 4: The method of any preceding Example, wherein generating the audio output comprises amplifying the audio input.

Example 5: The method of any preceding Example, further comprising, while in the second mode, playing back the audio output generated based on audio input received via the one or more microphones concurrently with playing back the received audio stream.

Example 6: The method of any preceding Example, further comprising, while in the second mode, playing the audio stream in synchrony with at least one second playback device.

Example 7: The method of Example 6, further comprising, while in the second mode, at least one of filtering, suppressing, or removing ambient sound in the environment corresponding to the audio stream being played back by the second playback device.

Example 8: The method of Example 3 and 4 alone or in combination with any preceding Example, wherein amplifying the audio content comprises amplifying the audio received via the one or more microphones according to a frequency profile corresponding to a user of the hearing aid.

Example 9. The method of Examples 3 and 4 alone or in combination with any preceding Example, further comprising, in the second mode, playing back the audio stream according to the frequency profile corresponding to the user of the hearing aid.

Example 10. The method of any preceding Example, wherein, in the second mode, the playback device receives the audio stream from one of: a second playback device; and a video display device.

Example 11. The method of any preceding Example, further comprising: switching from the first mode to the second mode after receiving a user input.

Example 12. The method of Example 11, wherein the user input comprises one of: a physical input via a control surface of the playback device; and a voice command detected via the one or more microphones.

Example 13. The method of any preceding Example, further comprising automatically switching from the first mode to the second mode receiving an indication that the playback device has been grouped with another playback device Example 14. The method of any preceding Example, further comprising: detecting the presence of a source device in proximity to the playback device; and after detecting the source device presence, automatically switching from the first mode to the second mode.

Example 15. The method of any preceding Example, wherein, during a transition from the first mode to the second mode, playback of the audio stream is gradually increased in volume.

Example 16. The method of any preceding Example, wherein receiving the audio stream via the wireless transceiver comprises receiving the audio stream via at least one of: a BLUETOOTH data network or a WIFI data network.

Example 17. The method of any preceding Example, wherein the audio playback device is a first playback device, the method further comprising: receiving an audio stream at a second playback device; in a first mode of the second playback device, playing back at least a portion of the audio stream via one or more electroacoustic transducers of the second playback device; and in a second mode of the second playback device, transmitting at least a portion of the audio stream via wireless transceiver from the second playback device to the first playback device.

Example 18. The method of Example 17, wherein, in the second mode, the second playback device does not play back the audio stream via the one or more electroacoustic transducers.

Example 19. The method of Example 17, wherein, in the second mode, the second playback device plays back the audio stream via the one or more electroacoustic transducers according to a different processing scheme than in the first mode.

Example 20. The method of Example 19, wherein, in the processing scheme of the second mode, the second playback device plays back less than all the frequencies of the audio stream.

Example 21. The method of one of Examples 17 to 20, wherein, in the second mode, the playback device transmits less than all the frequencies of the audio stream to the second playback device.

Example 22. The method of one of Examples 17 to 21, wherein, in the second mode, the portion of the audio stream transmitted to the first playback device depends at least in part on a determined location of the first playback device.

Example 23. The method of one of Examples 17 to 22, wherein, in the first mode, the second playback device plays back a first set of one or more channels of the audio stream, and wherein, in the second mode, the second playback device transmits a different set of one or more channels of the audio stream to the first playback device.

Example 24. The method of one of Examples 17 to 23, further comprising: receiving a user input; and after receiving the user input, switching, by the second playback device, from the first mode to the second mode.

Example 25. The method of any preceding Example, further comprising: detecting, that the first playback device is within a given proximity to the second playback device; and after detecting the presence, automatically switching at least one of the first and second playback devices from the first mode to the second mode.

Example 26. The method of one of Examples 17 to 25, further comprising: receiving a volume-up command signal; and in the first mode, responding to a volume-up command signal by increasing playback volume of the second playback device; and in the second mode, responding to a volume-up command by transmitting a volume-up command signal to the first playback device.

Example 27. The method of any preceding Example, wherein the audio stream received via the wireless interface of the first playback device is a first audio stream, the method further comprising: while in the second mode of the first playback device: receiving the first audio stream from a first gateway device and playing back the first audio stream; and after receiving a second audio stream from a second gateway device, ceasing playback of the first audio stream and playing back, via the one or more audio transducers, the second audio stream.

Example 28. The method of Example 28 wherein at least one of the first or second gateway devices is integrated with a non-wearable playback device.

Example 29. The method of Example 28 or 29, wherein at least one of the first or second gateway devices is communicatively coupled to a discrete, second playback device.

Example 30. The method of any one of the preceding Examples, further comprising: receiving a signal at the playback device; and after receiving the signal, one of: automatically transitioning from the first mode to the second mode; and outputting a user prompt indicating to the user to make a user input to transition from the first mode to the second mode.

Example 31. The method of any one of the preceding Examples, wherein the signal comprises an availability signal from the second gateway device.

Example 32. The method of any one of the preceding Examples, wherein the signal comprises an indication of proximity detection of the second gateway device.

Example 33. The method of Example 32, wherein the indication of proximity detection comprises a wireless signal-strength parameter.

Example 34. The method of Example 32, wherein the indication of proximity detection comprises a sonic localization parameter.

Example 35. The method of one of Examples 30 to 34, wherein the signal is received wirelessly from the first gateway device or the second gateway device.

Example 36. The method of one of Examples 30 to 34, wherein the signal is wirelessly received from a controller device.

Example 37. The method of one of Examples 30 to 36, wherein the signal comprises or is based on a voice input from a user.

Example 38. The method of any one of the preceding Examples, wherein the signal comprises a content parameter of the first audio stream.

Example 39. The method of Example 38, wherein the content parameter indicates a lack of audio content in the first audio stream.

Example 40. The method of one of Examples 30 to 39 wherein the signal comprises an indication that the playback device has been grouped with another playback device.

Example 41. A tangible, non-transitory computer-readable medium storing instructions that, when executed by one or more processors of a playback device, cause the playback device to perform operations comprising: the method of any one of the preceding Examples.

Example 42. A playback device comprising: one or more electroacoustic transducers; a wireless transceiver configured to facilitate communication via a wireless data network; and one or more microphones; and data storage having stored therein instructions that, when executed by the one or more processors, cause the one or more processors to perform the method of one of Examples 1 to 16.

Example 43: A media system configured to perform the method of any preceding Example, the system comprising: the playback device of Example 14; and a second playback device.

Example 44. A method comprising: receiving, by one or more non-wearable playback devices, media content, wherein the one or more non-wearable playback devices are configured to play the media content in synchrony with one another; receiving, by a gateway device commutatively coupled with at least one of the non-wearable playback devices, the media content; and receiving, by a wearable playback device that comprises a microphone and a transducer and that is commutatively coupled to the gateway device, the media content and simultaneously playing ambient audio received via the microphone and the media content via the transducer while the one or more non-wearable playback devices play the media content.

Example 45. The method according to Example 44, further comprising: responsive to determining that the wearable playback device is within a given range of the gateway device that facilitates communications with the gateway device, indicating, via the wearable playback device and to a user of the wearable playback device, that the wearable playback device is capable of playing the media content.

Example 46. The method according to Example 45, wherein when the wearable playback device is within the given range of the gateway device that facilitates communications with the gateway device the method further comprises: receiving an indication via a user interface of the wearable playback device to play the media content.

Example 47. The method according to one of Examples 44 to 46, wherein a particular non-wearable playback device of the one or more non-wearable playback devices comprises a user interface that facilitates simultaneous adjustments of a volume level associated with the one or more non-wearable playback devices, and wherein when the one or more non-wearable playback devices and the wearable playback device are simultaneously playing the media content, the method further comprises: responsive to receiving an indication via the user interface of the non-wearable playback device to adjust the volume of the non-wearable playback device, adjusting the volume of the non-wearable playback device without adjusting a volume associated with the wearable playback device.

Example 48. The method according to one of Examples 44 to 47, wherein a controller device comprises a user interface that facilitates simultaneous adjustments of a volume level associated with the one or more non-wearable playback devices, and wherein when the one or more non-wearable playback devices and the wearable playback device are simultaneously playing the media content, the method further comprises: responsive to receiving an indication via the user interface of the controller device to adjust the volume of the one or more non-wearable playback devices, adjusting the volume of the one or more non-wearable playback devices and a volume associated with the wearable playback device.

Example 49. The method according to one of Examples 44 to 48, wherein a particular non-wearable playback device of the one or more non-wearable playback devices comprises a microphone and a transducer, wherein the method further comprises: receiving, via the microphone of the non-wearable playback device, a voice assistant request; receiving a voice assistant response associated with the voice assistant request; simultaneously playing back the media content and the voice assistant response via the transducer of the non-wearable playback device; and playing back, by the wearable playback device, the media content without the voice assistant response.

Example 50. The method according to Example 49, further comprising: receiving, via the microphone of the wearable playback device, a voice assistant request; receiving a voice assistant response associated with the voice assistant request; and simultaneously playing back the media content and the voice assistant response via the transducer of the wearable playback device.

Example 51. A media system configured to perform the method of any preceding Example, the system comprising: one or more non-wearable playback devices configured to receive media content and to play the media content in synchrony with one another; a gateway device commutatively coupled with at least one of the non-wearable playback devices and configured to receive the media content; and a wearable playback device that comprises a microphone and a transducer and that is commutatively coupled to the gateway device, wherein the wearable playback device is configured to receive the media content and to simultaneously play ambient audio received via the microphone and the media content via the transducer while the one or more non-wearable playback devices play the media content.

The invention claimed is:

1. A gateway device comprising:
at least one communications interface;
at least one processor;
at least one non-transitory computer-readable medium comprising program instructions that are executable by the at least one processor such that the gateway device is configured to:
while one or more non-wearable playback devices are playing back audio content, receive, via an input interface, data representing the audio content;
when a wearable playback device is within a range of the gateway device, cause output of an indication that audio content is available for playback on the wearable playback device; and
cause, via the at least one communications interface, the wearable playback device to play the audio content in synchrony with playback of the audio content by the non-wearable playback devices, wherein the wearable playback device is configured to simultaneously play back ambient audio received via at least one microphone of the wearable playback device.

2. The gateway device of claim 1, wherein the at least one non-transitory computer-readable medium further comprises program instructions that are executable by the at least one processor such that the gateway device is configured to:
detect, via at least one sensor, signals indicating that the wearable playback device is within the range of the gateway device.

3. The gateway device of claim 2, wherein the at least one sensor comprises a wireless interface, and wherein the program instructions that are executable by the at least one processor such that the gateway device is configured to detect the signals indicating that the wearable playback device is within the range of the gateway device comprise program instructions that are executable by the at least one processor such that the gateway device is configured to:
detect, via the wireless interface, one or more messages indicating that the wearable playback device is within the range of the gateway device.

4. The gateway device of claim 1, wherein the program instructions that are executable by the at least one processor such that the gateway device is configured to cause output of the indication that audio content is available for playback on the wearable playback device comprise program instructions that are executable by the at least one processor such that the gateway device is configured to:
cause, via the at least one communications interface, an interface of the wearable playback device to output the indication that audio content is available for playback on the wearable playback device.

5. The gateway device of claim 4, wherein the indication comprises at least one of an audible tone and vocal guidance.

6. The gateway device of claim 1, wherein the program instructions that are executable by the at least one processor such that the gateway device is configured to cause output of the indication that audio content is available for playback on the wearable playback device comprise program instructions that are executable by the at least one processor such that the gateway device is configured to:
  cause an interface of the gateway device to output the indication that audio content is available for playback on the wearable playback device.

7. The gateway device of claim 6, wherein the indication comprises illumination of an indicator light.

8. The gateway device of claim 1, wherein the program instructions that are executable by the at least one processor such that the gateway device is configured to cause the wearable playback device to play the audio content comprise program instructions that are executable by the at least one processor such that the gateway device is configured to:
  cause, via the at least one communications interface, the wearable playback device to play portions of the audio content in a subset of frequencies that are being played back by the one or more non-wearable playback devices.

9. The gateway device of claim 7, wherein a particular one of the one or more non-wearable playback devices comprises the gateway device.

10. The gateway device of claim 8, wherein the subset of frequencies comprises frequencies corresponding to human speech.

11. The gateway device of claim 1, wherein the input interface comprises a high-definition multimedia interface (HDMI) port, and wherein the program instructions that are executable by the at least one processor such that the gateway device is configured to receive the data representing the audio content comprise program instructions that are executable by the at least one processor such that the gateway device is configured to:
  receive, via the HDMI port, the data representing the audio content.

12. The gateway device of claim 1, wherein the input interface comprises a network interface, and wherein the program instructions that are executable by the at least one processor such that the gateway device is configured to receive the data representing the audio content comprise program instructions that are executable by the at least one processor such that the gateway device is configured to:
  receive, via the network interface, the data representing the audio content.

13. The gateway device of claim 1, wherein the at least one non-transitory computer-readable medium further comprises program instructions that are executable by the at least one processor such that the gateway device is configured to:
  receive, via the at least one communications interface, data representing a voice input captured via a microphone of the wearable playback device; and
  cause, via the at least one communications interface, the wearable playback device to play back a spoken response to the voice input, wherein the spoken response is not played back by the one or more non-wearable playback devices.

14. At least one non-transitory computer-readable medium comprising program instructions that are executable by at least one processor such that a gateway device is configured to:
  while one or more non-wearable playback devices are playing back audio content, receive, via an input interface, data representing the audio content;
  when a wearable playback device is within a range of the gateway device, cause output of an indication that audio content is available for playback on the wearable playback device; and
  cause, via at least one communications interface, the wearable playback device to play the audio content in synchrony with playback of the audio content by the non-wearable playback devices, wherein the wearable playback device is configured to simultaneously play back ambient audio received via at least one microphone of the wearable playback device.

15. The at least one non-transitory computer-readable medium of claim 14, wherein the at least one non-transitory computer-readable medium further comprises program instructions that are executable by the at least one processor such that the gateway device is configured to:
  detect, via at least one sensor, signals indicating that the wearable playback device is within the range of the gateway device.

16. The at least one non-transitory computer-readable medium of claim 15, wherein the at least one sensor comprises a wireless interface, and wherein the program instructions that are executable by the at least one processor such that the gateway device is configured to detect the signals indicating that the wearable playback device is within range of the gateway device comprise program instructions that are executable by the at least one processor such that the gateway device is configured to:
  detect, via the wireless interface, one or more messages indicating that the wearable playback device is within the range of the gateway device.

17. The at least one non-transitory computer-readable medium of claim 14, wherein the program instructions that are executable by the at least one processor such that the gateway device is configured to cause output of the indication that audio content is available for playback on the wearable playback device comprise program instructions that are executable by the at least one processor such that the gateway device is configured to:
  cause, via the at least one communications interface, an interface of the wearable playback device to output the indication that audio content is available for playback on the wearable playback device.

18. The at least one non-transitory computer-readable medium of claim 14, wherein the program instructions that are executable by the at least one processor such that the gateway device is configured to cause the wearable playback device to play the audio content comprise program instructions that are executable by the at least one processor such that the gateway device is configured to:
  cause, via the at least one communications interface, the wearable playback device to play portions of the audio content in a subset of frequencies that are being played back by the one or more non-wearable playback devices.

19. The at least one non-transitory computer-readable medium of claim 14, wherein the at least one non-transitory computer-readable medium further comprises program instructions that are executable by the at least one processor such that the gateway device is configured to:
  receive, via the at least one communications interface, data representing a voice input captured via a microphone of the wearable playback device; and
  cause, via the at least one communications interface, the wearable playback device to play back a spoken response to the voice input, wherein the spoken response is not played back by the one or more non-wearable playback devices.

20. A method comprising:
   while one or more non-wearable playback devices are playing back audio content,
      receive, via an input interface of a gateway device, data representing the audio content;
      when a wearable playback device is within a range of the gateway device, cause output of an indication that audio content is available for playback on the wearable playback device; and
      cause, via at least one communications interface of the gateway device, the wearable playback device to play the audio content in synchrony with playback of the audio content by the non-wearable playback devices, wherein the wearable playback device is configured to simultaneously play back ambient audio received via at least one microphone of the wearable playback device.

* * * * *